(12) United States Patent
Fontaine et al.

(10) Patent No.: US 10,043,144 B2
(45) Date of Patent: *Aug. 7, 2018

(54) COMPUTER-IMPLEMENTED ENGINEERING REVIEW OF ENERGY CONSUMPTION BY EQUIPMENT

(71) Applicant: Leidos, Inc., Reston, VA (US)

(72) Inventors: Eric James Fontaine, Jamesville, NY (US); Lars Johan Brasz, Fayetteville, NC (US); Kristi Jo Kezar, Camillus, NY (US)

(73) Assignee: Leidos, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,059

(22) Filed: Sep. 26, 2017

(65) Prior Publication Data

US 2018/0025302 A1 Jan. 25, 2018

Related U.S. Application Data

(63) Continuation of application No. 13/760,492, filed on Feb. 6, 2013, now Pat. No. 9,785,902.

(51) Int. Cl.
  *G06Q 10/00* (2012.01)
  *G06Q 10/06* (2012.01)
(52) U.S. Cl.
  CPC ... *G06Q 10/0635* (2013.01); *G06Q 10/06312* (2013.01); *G06Q 10/06313* (2013.01); *G06Q 10/06393* (2013.01)
(58) Field of Classification Search
  CPC ........... G06Q 30/0611; G06Q 30/0631; G06Q 10/06; G06Q 10/0635
  See application file for complete search history.

(56) References Cited

U.S. PATENT DOCUMENTS

| 6,904,336 B2 * | 6/2005 | Raines | G06Q 30/02 700/286 |
| 7,076,339 B2 * | 7/2006 | Yabutani | G06Q 30/0241 700/291 |

(Continued)

OTHER PUBLICATIONS

Hallinan, Kevin P.; Kissock, J. Kelly; Brecha, Robert J.; and Mitchell, Austin, "Targeting Residential Energy Reduction for City Utilities Using Historical Electrical Utility Data and Readily Available Building Data" (2011). Physics Faculty Publications. Paper 16. http://ecommons.udayton.edu/phy_fac_pub/16.*

(Continued)

*Primary Examiner* — Anita Yvonne Coupe
*Assistant Examiner* — Tyler W Knox
(74) *Attorney, Agent, or Firm* — Dawn-Marie Bey; Bey & Cotropia PLLC

(57) ABSTRACT

A computer-implemented system and method are disclosed for performing engineering review of energy consumption by one or more equipment. One or more computers are connected to a specifications database. The computers are configured to receive end-user configurations corresponding to first equipment; retrieve one or more second equipment, as well as second equipment specifications from the specifications database; calculate an invoicing statement for the second equipment; and provide an engineering review report of the energy savings realized by implementing the second equipment. The first equipment may be an existing equipment, while the second equipment is one or more energy-efficient replacement alternatives to the first equipment. Each step is performed in real-time, using automated software modules and sub-modules. The engineering review report is applicable as an instant approval or pre-approval, qualifying the end-user for purchase incentives, which apply when the energy-efficient equipment alternatives are adopted by the end-user.

18 Claims, 13 Drawing Sheets

(56) References Cited

U.S. PATENT DOCUMENTS

| | | | | |
|---|---|---|---|---|
| 7,130,832 | B2* | 10/2006 | Bannai | G06Q 10/06 705/412 |
| 7,246,014 | B2* | 7/2007 | Forth | G01D 4/004 702/57 |
| 7,822,647 | B1* | 10/2010 | Mussman | G06F 17/30867 705/14.49 |
| 7,831,702 | B2* | 11/2010 | Johnson | G01D 4/004 709/220 |
| 9,785,902 | B1* | 10/2017 | Fontaine | G06Q 10/0635 |
| 2002/0052666 | A1* | 5/2002 | Fukatsu | G06Q 10/06 700/107 |
| 2002/0116239 | A1* | 8/2002 | Reinsma | G06Q 10/04 705/7.17 |
| 2002/0178047 | A1* | 11/2002 | Or | G06Q 10/04 705/412 |
| 2006/0155423 | A1* | 7/2006 | Budike, Jr. | G06Q 10/06 700/286 |
| 2008/0319812 | A1* | 12/2008 | Sousa | G06Q 10/06 705/7.36 |
| 2010/0076835 | A1* | 3/2010 | Silverman | G06Q 10/06 705/14.33 |
| 2010/0100405 | A1* | 4/2010 | Lepore | G06Q 10/06 705/7.38 |
| 2010/0138279 | A1* | 6/2010 | Cohen | G06Q 10/0639 705/7.38 |
| 2010/0223081 | A1* | 9/2010 | Espino, Jr. | G06Q 10/06375 705/7.37 |
| 2010/0305998 | A1* | 12/2010 | de la Torre Bueno | G06Q 10/06 705/7.37 |
| 2011/0016017 | A1* | 1/2011 | Carlin | G06Q 10/06 705/26.4 |
| 2011/0040785 | A1* | 2/2011 | Steenberg | G05B 23/0235 707/769 |
| 2011/0119113 | A1* | 5/2011 | Chatterjee | G06Q 10/06 705/7.36 |
| 2011/0161131 | A1* | 6/2011 | Takahashi | G06Q 10/06 705/7.24 |
| 2011/0166913 | A1* | 7/2011 | Buchanan | G06Q 10/06 705/7.39 |
| 2011/0190951 | A1* | 8/2011 | Lee | G05D 23/19 700/291 |
| 2011/0295640 | A1* | 12/2011 | Valentini | G06Q 10/06 705/7.19 |
| 2011/0299541 | A1* | 12/2011 | Diab | G06Q 20/10 370/401 |
| 2012/0203596 | A1* | 8/2012 | Guthridge | G06Q 10/0637 705/7.37 |
| 2012/0284124 | A1* | 11/2012 | Harangozo | G06Q 30/02 705/14.66 |

OTHER PUBLICATIONS

"eQuest Introductory Tutorial, version 3.63," James J. Hirsch & Associates, Apr. 2009, pp. 2, 111-126, 130-134.*
"NPL_Search Results_715716059" listing of non-patent literature sources, articles, and search results considered, accessed Apr. 13, 2018.*
"NPL_13760492" listing of non-patent literature sources, articles, and search results considered.
"eQuest Introductory Tutorial, version 3.63," James J. Hirsch & Associates, Apr. 2009, pp. 3, 111-126, 130-134.
"2011 Federal Tax Credits for Consumer Energy Efficiency," published Nov. 16, 2010, accessed Mar. 11, 2015, pp. 1-6, accessed by Wayback Machine, available at <https://web.archive.org/web/20110224030900/http://www.energystar.gov/index.cfm?c=tax_credits.tx_index>.
Hallinan, Kevin P., Kissock, J. Kelly, Brecha, Robert J., and Mitchell, Austin, "Targeting Residential Energy Reduction for City Utilities Using Historical Electrical Utility Data and Readily Available Building Data," Physics Faculty Publications, Paper 16, 2011, available at <http://ecommons.udayton.edu/phy_fac_pub/16>.
Hirsch, James J., "Overview of DOE-2.2," University of California, Camarillo, California, Jun. 1998.
Sezgen, Osman, et al., "Technology Data Characterizing Space Conditioning in Commercial Buildings: Application to End-Use Forecasting With Commend 4.0," University of California, Berkeley,CA, Dec. 1995.

* cited by examiner

400

Customer and Project Information

| Ameren Illinois Customer Information |||||
|---|---|---|---|---|
| Company Name | | Ameren Illinois Electric Acct | | 410 |
| Tax ID SSN/FEIN | W-9 form is required documentation Click here for a blank W-9 form | Ameren Illinois Natural Gas Acct. | | |

| Mailing Address | City | State | Zip |
|---|---|---|---|
| 710 W Third Street | Peoria | IL | |

| Contact Name | Title | 420 |
|---|---|---|
| E-mail Address | Phone | Ext. | Fax |

Physical Installation Address (if different than above)

| Installation Address | City | State | Zip |
|---|---|---|---|
| | | IL | |

Check one: ☐ Owner ☐ Tenant (if tenant, please complete the Landlord Consent Form)

Name(s) of the person(s) who referred you to the Business Program for this project:

| Name of Ameren Illinois or Business Program Employee | Name of Referring Contractor or Program Ally |
|---|---|

Contractor/Program Ally Information (if applicable)

| Company Name | Contact Name | Title |
|---|---|---|
| Mailing Address | City | State | Zip |
| E-mail Address | Phone | Ext. | Fax |

Facility/Project Description

Facility Type (check one):
- ☒ Office
- ☐ Medical
- ☐ Restaurant
- ☐ Grocery
- ☐ School/College
- ☐ Other (please specify):
- ☐ Warehouse/Distribution
- ☐ Retail/Service
- ☐ Manufacturing/Industrial
- ☐ Hotel/Motel
- ☐ Multiple

If Manufacturing/Industrial, specify type:
- ☐ Food Processing
- ☐ Automotive/Transportation/Infrastructure
- ☐ Other (please specify):

405

Project Description (check one):
- ☐ Replacement of Failed Equipment
- ☒ Replacement of Operating Equipment (retrofit)
- ☐ Process Improvement Facility Size (total interior square feet served by the account number provided above): 30000

Newer versions posted to the web site supersede all previous versions. The revision number is listed in the footer of each page. The version of the application that was available at the time you submitted your pre-approved application will apply.

415 → SUBMIT

Fig. 4

Equipment Configuration Details

Fig. 5

Applications | Projects | Logout

Equipment Configuration Details

Application Management Platform

800

| ent | Proposed Equipment | Space Equipment | Summary | Space Equipment |

Energy Savings (kWh) : 37613     Incentive : $1,728.87

| Space Details | Equipment |

Area Description: Main Hall

Space Type: Education - University (Interior)   ← 805

Area Cooling: Cooled Space   ← 810

Enter Hours of Operation

[ Save ]  [ Cancel ]

Fig. 8

Applications | Projects | Logout

Equipment Configuration Details

| Project Details | Existing Equipment | Proposed Equipment | Space Equipment | Summary |

Incentive and Energy Savings

Incentive: $1,743.35
Energy Savings/year (kWh): 97902
Change in Connected Load (kW): 12.37
Demand Savings (kW): 10.11

Existing Equipment

| Description | Quantity |
|---|---|
| Fluorescent, (4) 48", STD lamp, Standard magnetic ballast | 152 |
| Incandescent, (1) 100W lamp | 26 |

Proposed Equipment Bill of Materials

| Type | Manufacturer | Model | Quantity |
|---|---|---|---|
| CFL Screw Lamp | Philips | ELmdT 13W GU24 | 26 |
| T8 Ballast | TCP | TCP4P32ISUNVH | 141 |
| T8 Lamp | Satco | F28T8/830ES/ENV | 564 |

Application Number : NSI
☑ By Checking this box, you agree to our Terms and Conditions, and acknowledge that the incentives shown above assume this application is submitted today and are not guaranteed in the future.

[Submit]

Fig. 9

Invoice Details

Application Number: CI94583
Project Name: OHL 2

Application Number : CI94583
Invoice Identifier : 950473 *
Invoice Date : 11/14/2012 *
Vendor : ABC Electric
Comments :

Invoice File : Invoice test.txt [Choose File] No file chosen *

1105 → [Bill to Items] [Other Items]

| Item Description | BOM Quantity | This Invoice | | | All Invoices | | |
|---|---|---|---|---|---|---|---|
| | | Quantity | Unit Cost | Extended Cost | Total Quantity | Total Cost | |
| Philips EL/mdT 13W | 20 | 15 | 2.28 | $35.70 | 21 | $50.82 | |
| Sylvania CF13EL/MICRO/827/LS/RP 2 | 20 | | | $0.00 | | $0.00 | |
| Albee Technologies H-216450-U2ACD00-12 | 20 | | | $0.00 | | $0.00 | |
| BELAIR LIGHTING, INC. 40181-PW | 3 | 3 | 23.26 | $69.78 | 3 | $69.78 | |
| Ruud Lighting ESA-ADR-4-14-C-MD-XZ-Y/Y-525-35K | 10 | | | $0.00 | | $0.00 | |
| H&H BEH332@277 2 28 4 T8 | 36 | 24 | 11.23 | $269.52 | 36 | $404.52 | |
| Sylvania QHE2x32T8/UNV ISN-SC@120 2 32 4" T8 | 85 | 80 | 10.28 | $822.40 | 85 | $873.65 | |
| Sylvania QHE4x32T8/UNV ISN-SC 1@120 4 32 4" T8 | 85 | 85 | 12.35 | $1,049.75 | 85 | $1,049.75 | |

[Save] [Cancel]

* Indicates Required Fields

1100

1110 ← Invoice File
1115 ← This Invoice
1120 ← (item list)

Fig. 11

Invoice Details                                                              1300A
Application Number: CI94583
Project Name: OHL 2

Application Number : CI94583
Invoice Identifier : 950473  *
Invoice Date : 11/14/2012  *
Vendor : ABC Electric
Comments :
Invoice File : invoice test.txt [Choose File] No file chosen  *

| Bill of Materials | | | |
|---|---|---|---|
| Item Type | Description | Cost | Total Cost |
| Disposal | | | |
| Labor | | | |
| Miscellaneous | wires, hangers, etc. | 50.00 | $50.00 |
| Tax | | | |

[Save] [Cancel]

* Indicate Required Fields

1300B
                                                                                 Close
Invoice Details
Application Number: CI94583
Project Name: OHL 2

[New Invoice]

| | | Invoice Identifier | Invoice Date | File Name | Vendor | Invoice Total |
|---|---|---|---|---|---|---|
| Edit | Delete | 950473 | 11-14-2012 | invoice test.txt | ABC Electric | $2,950.31 |
| Edit | Delete | 34687 | 11-14-2012 | invoice test.txt | ABC Electric | $201.37 |

☐ User attests that information is true and complete.

[Submit Invoices for Payment]

Last Submitted for Payment :01-24-2013 15:26

Fig. 13

COMPUTER-IMPLEMENTED ENGINEERING REVIEW OF ENERGY CONSUMPTION BY EQUIPMENT

CROSS REFERENCE TO RELATED APPLICATIONS

This application is a continuation of U.S. patent application Ser. No. 13/760,492, filed Feb. 6, 2013, entitled "Computer-Implemented Engineering Review of Energy Consumption By Equipment," the entirety of which his incorporated herein by reference.

TECHNICAL FIELD

The present disclosure relates to a computer-implemented method and system for performing engineering review of energy consumption by one or more equipment and using the engineering review as a basis for preparing an energy-savings assessment for an end-user.

BACKGROUND

The energy efficiency services market provides purchase incentives to end consumers to undertake projects that reduce energy consumption. Such projects may typically involve the purchase of new and more efficient equipment to replace existing and in-use equipment, or to retrofit the existing and in-use equipment. The term "equipment" as used throughout this disclosure, unless indicated otherwise, refers to electrical, electronic, or gas-based equipment that consumes energy directly, or indirectly, in any form from an energy source. Indirect energy consumption is obtained by certain equipment, such as white roof that reduces the burden on energy consuming equipment. Exemplary equipment include heating, ventilation, and air-conditioning (HVAC) systems—including custom HVAC equipment and controls, prescriptive HVAC equipment and controls, custom HVAC variable frequency drives (VFDs) and prescriptive VFDs, custom process VFDs; prescriptive strip curtains; motors; commercial refrigerators and freezers; ice machines; steam cookers; water heaters; pre-rinse sprayers; vending equipment; laundry equipment; strip plug outlets; hot food holding cabinets; commercial fryers; ovens; griddles; anti-sweat heat controls; window films; copying machines; lighting systems—including custom lighting, or prescriptive lighting; residential appliances—including fans, residential HVACs, washers, dryers, dishwashers, etc.; industrial equipment; heavy machinery; automated systems; computers; network systems; solar systems; cool roof; process steam equipment; and steam traps.

An energy source typically includes one or more of renewable or nonrenewable energy sources, including direct energy from a battery, gas sources, a solar cell architecture, or wind farm; or indirect energy from a regular transmission line, drawing from a power station, using a local utility company. Such equipment may include components. The term "component" as used throughout this disclosure, unless indicated otherwise, refers to parts within the equipment that is independently configured to consume energy, directly or indirectly. As an example, a computer equipment includes a memory drive component. The memory drive component is typically a solid-state semiconductor chip or a rotating disk drive, both of which consume electrical energy for purposes of storage and delivery of information. Typically, the sum total of energy consumption by various components within an equipment is the energy consumed by the equipment.

A purchase incentive typically applies to replacement of existing equipment, such that the benefits of reduced energy usage costs, as well as any other subsidy provided by an entity may be realized. The term "entity," as used throughout this disclosure, unless indicated otherwise, refers to an organization or individual offering a subsidy, such as an equipment manufacturer, a utilities service provider, or a government entity. Purchase incentives are typically available for replacement or retrofitting processes, generally referred to as "projects," in this disclosure. Typical projects available to the energy efficiency services market, include replacement of failed equipment, retrofitting of exiting equipment, or process improvement projects. In this disclosure, one or more methodologies for calculating energy savings obtained when equipment is replaced by energy-efficient alternative equipment are referred to as a "program" or an "enrollment program." Such enrollment programs are typically implemented by the end-user's utility service-provider, an equipment manufacturer, or a government agency. The utility service-provider, equipment manufacturer, or government agency offering such enrollment programs are referred to, throughout this disclosure, as "entities."

Such programs are often implemented via implementation contractors, such as an "Energy Efficiency Services" group operating in the energy efficiency services market. In this role, implementation contractors typically evaluate the energy savings for all projects, as precisely as possible, to ensure that the proper purchase incentives are applied and appropriate energy savings are counted toward an enrollment program's goal.

Proper estimation of the energy savings and validation of the eligibility prescribed measures for one or more equipment in an enrollment program is a typical problem in the energy efficiency services market. Unlike a typical product-oriented rebate program, where purchase incentives are directly applied to a customer, when the customer sends a Universal Product Code (UPC) label off the package to the manufacturer; in a service-oriented program, such as energy services, the energy consumed by an equipment is variable and depends on a lot of factors. Energy consumption may not only depend on the many possible configurations of the equipment, but also on the environment in which it is used.

Engineering reviews are often initiated by an end-user and cost more than the value of the purchase incentive offered by the service provider. Such engineering reviews are manually constrained and may also delay the start of construction of a project within an enrollment program. These factors have led to reduced participation in the engineering review process that result in imprecise savings and inequitable distribution of purchase incentives. A prescriptive approach to engineering review may apply assumptions that have, over time, become unacceptable due to the variables in the location of the equipment, leading to increasingly complicated requirements. Such prescriptive approaches rival the complexity of a custom program with an engineering review approach.

SUMMARY

The system and method described herein attempt to overcome the drawbacks discussed above using a computer-implemented method and system for performing engineering review of energy consumption by one or more equipment and using the engineering review as a basis for preparing an energy-savings assessment for an end-user.

In an exemplary implementation, a computer-implemented method for performing engineering review of energy consumption by one or more equipment is disclosed. The computer-implemented method includes receiving, at a computer, end-user configurations corresponding to one or more first equipment and a selection of one or more enrollment programs. The one or more first equipment is directly or indirectly configured to consume energy from one or more energy sources. Further, each enrollment program corresponds to one or more methodologies for calculating energy savings obtained when the one or more first equipment is replaced by one or more second equipment. A retrieving process retrieves, from a specifications database to the computer, the one or more second equipment and second equipment specifications. The one or more second equipment is a proposed replacement for the one or more first equipment and each second equipment specification corresponds to the selected enrollment program. Further, each equipment specification includes: a demand consumption value for the one or more second equipment; one or more purchase incentives offered by one or more entities related to the selected enrollment program and the one or more second equipment; an attribute value corresponding to a demand consumption value of each component in the one or more second equipment; and one or more eligibility rules for determining if the one or more second equipment qualifies for one or more prescribed measures corresponding to one or more purchase incentives. A calculating process, by the computer, calculates an energy savings value calculated from the demand consumption value and an invoicing statement corresponding to the end-user configuration and the one or more second equipment. The invoicing statement includes a bill of materials for the one or more second equipment and fields to receive an actual unit cost for one or more entries in the bill of materials. A preparing process, by the computer prepares an engineering review report for the one or more second equipment. The engineering review report includes the energy savings value, the invoicing statement, and a mapping of the one or more second equipment to one or more of the second equipment specifications. A transmitting process, from the computer, transmits the engineering review report to an end-user, thereby enabling an end-user to access engineering review of the energy savings realized by replacing the one or more first equipment with the one or more second equipment.

In another exemplary implementation, a computer-implemented system for performing engineering review of energy consumption by one or more equipment is disclosed. A computer receives the end-user configurations corresponding to one or more first equipment and a selection of one or more enrollment programs. The one or more first equipment is directly or indirectly configured to consume energy from one or more energy sources and each enrollment program corresponds to one or more methodologies for calculating energy savings obtained when the one or more first equipment is replaced by one or more second equipment. A specifications database, in electronic communication with the computer, provides the one or more second equipment and second equipment specifications. The one or more second equipment is a proposed replacement for the one or more first equipment and each second equipment specification corresponds to the selected enrollment program. Each second equipment specification includes one or more of: a demand consumption value for the one or more second equipment; one or more purchase incentives offered by one or more entities related to the selected enrollment program and the one or more second equipment; an attribute value corresponding to a demand consumption value of each component in the one or more second equipment; and one or more eligibility rules for determining if the one or more second equipment qualifies for one or more prescribed measures corresponding to one or more purchase incentives. The computer is configured to calculate an energy savings value calculated from the demand consumption value and an invoicing statement corresponding to the end-user configuration and the one or more second equipment. The invoicing statement includes a bill of materials for the one or more second equipment and fields to receive an actual unit cost for one or more entries in the bill of materials. The computer prepares an engineering review report for the one or more second equipment. The engineering review report includes the energy savings value, the invoicing statement, and a mapping of the one or more second equipment to one or more of the second equipment specifications. The computer transmits the engineering review report to an end-user, thereby enabling an end-user to access engineering review of the energy savings realized by replacing the one or more first equipment with the one or more second equipment.

In yet another exemplary implementation, a computer-readable code product for performing engineering review of energy consumption by one or more equipment is disclosed. The computer-readable code product includes computer-readable code, executable on a computer, for one or more software modules. The one or more software modules include user-interface for receiving from an end-user: a request for end-user configurations corresponding to one or more first equipment and a selection of one or more enrollment programs. The one or more first equipment is directly or indirectly configured to consume energy from one or more energy sources and each enrollment program corresponds to one or more methodologies for calculating energy savings obtained when the one or more first equipment is replaced by one or more second equipment. The software modules on the computer receive an engineering review report responsive to the end-user configurations. The engineering review report is provided to the end-user via the user-interface and enables the end-user to access engineering review of the energy savings realized by replacing the one or more first equipment with the one or more second equipment. Further, the engineering review report includes one or more second equipment, and one or more second equipment specifications. The one or more second equipment is a proposed replacement for the one or more first equipment. Each second equipment specification corresponds to the one or more second equipment and the selected enrollment program. Each second equipment specification also includes one or more of: a demand consumption value for the one or more second equipment; one or more purchase incentives offered by one or more entities related to the selected enrollment program and the one or more second equipment; an attribute value corresponding to a demand consumption value of each component in the one or more second equipment; and one or more eligibility rules for determining if the one or more second equipment qualifies for one or more prescribed measures corresponding to one or more purchase incentives. The engineering review report includes an energy savings value calculated from the demand consumption value and an invoicing statement that corresponds to the end-user configuration and the one or more second equipment. The invoicing statement includes a bill of materials for the one or more second equipment and fields to receive an actual unit cost for one or more entries in the bill of materials.

BRIEF DESCRIPTION OF THE DRAWINGS

The accompanying drawings constitute a part of this specification and together with the specification, illustrate certain exemplary implementations of this disclosure.

FIG. 4 is an illustration of an exemplary user-interface within the application approval software module of an end-user's computer, for providing account and general project information for an end-user.

FIG. 5 is an illustration of an exemplary user-interface tab within the invoicing software module or the tracking and reporting software module of an end-user's computer, for providing end-user configuration.

FIG. 8 is an illustration of an exemplary user-interface page within the software module of an end-user's computer, for providing interactive effects from area cooling, as well as the building envelope configuration, from the area description of the equipment location.

FIG. 9 is an illustration of an exemplary user-interface page within the software module of an end-user's computer, for receiving a bill of materials and an engineering review report.

FIG. 11 is an illustration of an exemplary user-interface section of an invoicing statement that has been reconciled by an end-user, in accordance with this disclosure.

DETAILED DESCRIPTION

Reference will now be made in detail to the preferred implementations, examples of which are illustrated in the accompanying drawings.

The computer-implemented system and method disclosed herein perform engineering review of energy consumption by one or more equipment. The engineering review of energy consumption is applicable as a basis for preparing an energy-savings assessment for an end-user.

The disclosure herein covers implementations using two approaches. In one approach, one or more fully-functional software modules function independently on a single computer to provide an engineering review of energy consumption by one or more equipment In a second approach, the fully functional software modules are split into one or more "thin-client" software modules, and one or more computing software modules. The thin-client software modules typically provide basic user-interface functionality, as well as some basic software rules governing the user-interface. On the other hand, computing software modules provide the major computing functions, including: searching; rules management; approvals; calculations; and other complex computing tasks. In an example, the function of particular software module is divided into sub-modules. It is appreciated that the function is fully performed by the software module, on a single computer. Alternatively, the function may be split into a user-interface component, with some computing functions, on a first computer; and a computing component, rendered on a second computer; the first and second computers interface with each other and a specifications database via a communication network.

It is appreciated that software modules or sub-modules, as used throughout this disclosure refer to application programming interface (API) sections of computer-readable code that are typically modular in structure and are extendable to include functionality of classes within the API. Alternatively, the software modules or sub-modules are schemas of computer-readable code, extendable to include functionality of classes within the schema. In an exemplary implementation, the software modules or sub-modules as described here are coded on a software platform offered by SALESFORCE.COM Inc. (a sales force automation platform), using APEX (a programming language), JAVA (a programming language), VISUALFORCE (a component-based user interface framework), and XML. Further, the software modules on the user-interface may be form-based Adobe® applications that allow an end-user to provide information for submission to a different computer or another software module in the same computer.

Figure 1:
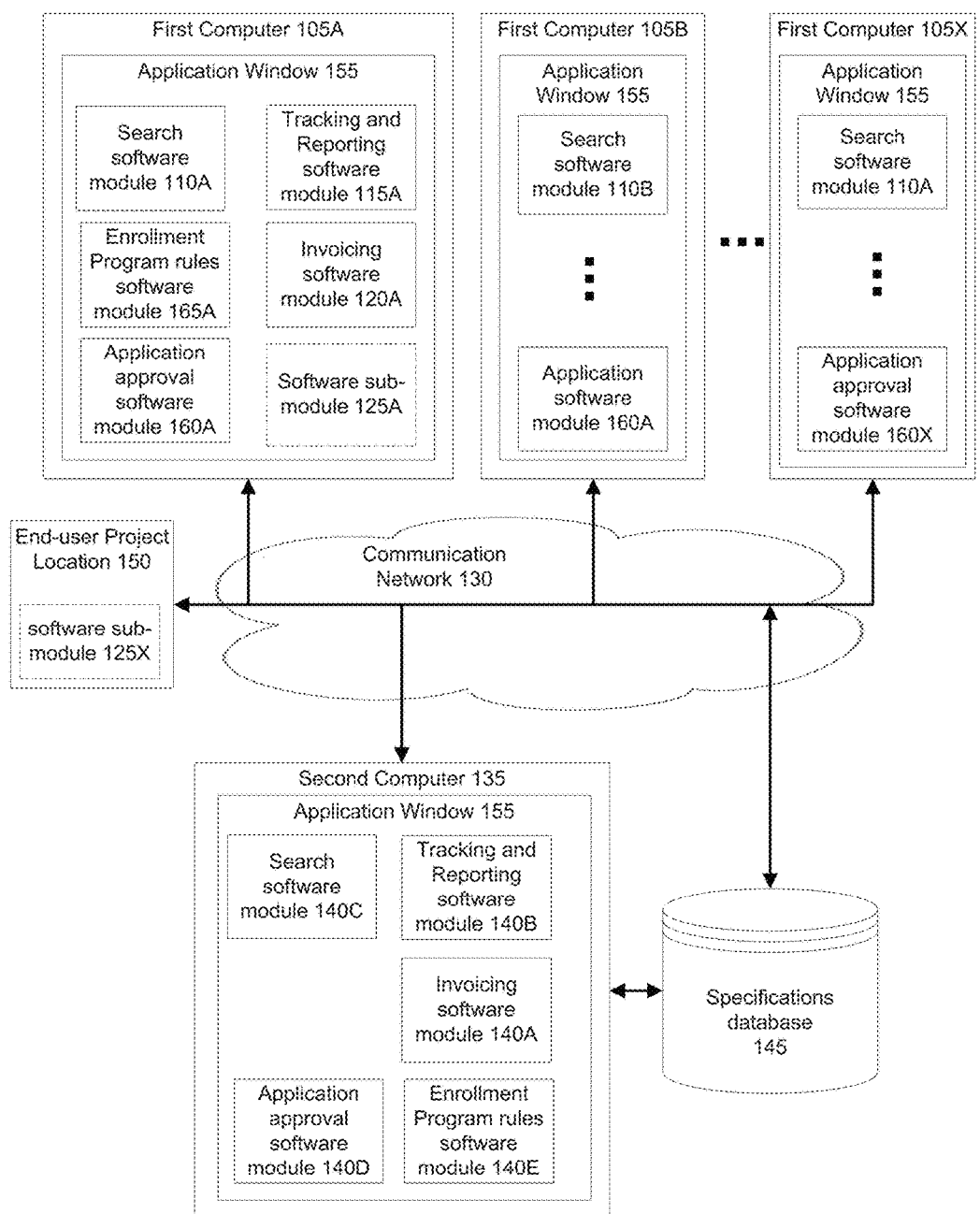
FIG. 1 illustrates an exemplary computer-implemented system and computer-readable code product for performing engineering review of energy consumption by one or more equipment.

FIG. 1 illustrates an exemplary computer-implemented system and computer-readable code product 100 for performing engineering review of energy consumption by one or more equipment. The computer-implemented method includes a second computer 135 for receiving, from one or more first computers 105A-X, end-user configurations corresponding to one or more first equipment and a selection of one or more enrollment programs. First equipment typically corresponds to existing equipment at a project location identified by the end-user and that the end-user desires to update, retrofit, or change. An enrollment program corresponds to one or more methodologies for calculating energy savings obtained when the one or more first equipment is replaced by one or more second equipment. The existing equipment is generally referred to herein as the "first equipment," while the proposed replacement equipment is generally referred to herein as the "second equipment." The existing equipment may be replaced by the proposed, energy-efficient replacement equipment; may be retrofitted with energy-efficient components; or may be replaced by equipment that is more efficient than the building code requirements. Further, the proposed equipment may replace non-energy consuming existing equipment that indirectly affects energy consumption, such as, white roofs.

In an exemplary implementation, the first computer 105 and the second computer 135 represent different computers that are independently configured to perform engineering review of energy consumption by one or more equipment. The specifications database 145 provides the equipment specifications and related information required to perform the engineering review. It is appreciated that if the first computer 105 is connected directly to the specifications database 145, the first computer is capable of independently performing the engineering review. However, in an exemplary implementation, the software modules 110, 115, 120, 160, 165, and sub-module 125 are implemented as thin-clients on the first computer 105, with user-interface functionality, while its counterpart software modules 140A-D and the enrollment program rules software module 140E are computing software modules, for performing the computing tasks related analysis, calculations, searches, and other heavy functionality required by the system 100. The enrollment program rules software module 140E may be a dedicated software module for enforcing the rules governing approvals for the engineering review processes described in this disclosure.

End-user configurations, as used throughout this disclosure, refers to arrangements of existing equipment; selection of one or more enrollment programs; end-user information; project information; existing equipment and equipment information; and other environmental conditions at the end-user's location or the location of the equipment for a project. Such a location may be remotely displaced from the end-user's location. In FIG. 1, the end-user project location 150 corresponds to a location of the project equipment, different from the location of the first computer 105A. It is appreciated that an end-user may be a contractor working on behalf of the owner or tenant who benefits directly from any equipment at a project location.

The environmental conditions described above include, but are not limited to: weather conditions; scheduling conditions, such as hours of operation of one or more equipment, like an air-conditioning system; heating and cooling set-points in the equipment; and building envelope conditions, such as the insulation level, ceiling height, etc. In cases where the end-user's location is displaced from the project location, the end-user may choose to implement automated software sub-modules 125A in one or more, local or remote, end-user project locations 150. Each software sub-module 125A is configured to automatically or manually interact with one or more software modules 110A-160X on the respective end-user's computer, illustrated as first computer 105A-X. The sub-modules may be hardware and software based devices, configured to automatically track and record environmental conditions and provide such environmental conditions to the respective first computer 105A-X via one or more network communication interfaces, such as an IEEE 802.11 wireless standard interface; a BLUETOOTH standard wireless interface; a radio communication standard interface; a Near Field Communication (NFC) standard interface; a cellular GSM, CDMA, 3G, or 4G wireless network; or a wired Ethernet standard interface. The respective first computers 105A-X may then forward the automated environmental condition information to the second computer 135 via the tracking and reporting software module 115A, which is configured to send automatic and/or manual entries to another computer. As illustrated in FIG. 1, the software sub-module 125A may reside at the displaced project equipment location 150 and may communicate with first computer 105A via the communication network 130.

Alternatively, a user may provide the environmental conditions manually via an application window 155, which hosts the may user-interface pages provided within each software module 110A-160A. In an example, manual environmental conditions may be provided via the tracking and reporting software module 115A-X, on the respective first computers 105A-X. It is appreciated that the manually input at the tracking and reporting software module is applied in or via a delayed interface. A delayed interface is a static software module within a webpage, for instance, where the static software module provides a list of questions or fields with entry requirements. The end-user may manually provide entries or responses, prior to submitting the entered information to the computer 135. A interface allows the user to provide input, which instantaneously updates a remote tracking and reporting software module 140B in the computer 135 and may instantaneously provide results or suggestions from a different computer or a software module within the computer 135.

Each software module or sub-module in FIG. 1 is illustrated as a single software module or sub-module, but may include one or more software sub-module or modules working together to achieve a common goal. Further, the environmental conditions provided manually by an end-user may simply include the zip code(s) of the location of the end-user's equipment. The computer 135 is configured to receive manual entries from the respective computers 105A-X and then research the environmental conditions at the equipment location using one of many research methods—such as using the zip code(s) to identify standard weather-station information available via the internet to obtain weather at the equipment location. Such research is typically performed on the computer 135 via the tracking and reporting software module 140B. Further, such research is also considered an automated method of retrieving environmental conditions, because the user is not expressly providing such information, but only provides the zip code(s).

Further, the automated sub-modules 125A may transfer the automated environmental condition information to the respective search software module 110 A-X, which generates a hybrid combination of the automated environmental condition information and any manually entered information, prior to transmitting the hybrid end-user configuration information to the second computer 135. In an exemplary implementation, the remote tracking and reporting software module 140B is illustrated as a single software module, but may include multiple sub-modules or modules, each configured to track entries from the first computers 105A-X. Further, in addition to weather data, the automated sub-modules 125A may also determine a climate zone and building code as expressed in ASHRAE standard 90.1. The end-user may select an approximate building vintage by a manual entry in the software modules 110A-X or tracking and reporting software module 140B. The vintage, in combination with the climate zone, may be applied to determine the building envelope characteristics, such as a level of insulation, a window performance metric, etc.

In an exemplary implementation, the weather conditions related to environmental conditions disclosed above, typically includes outdoor air temperature, which may have a significant impact on energy savings of any given project An automated software sub-module 125A interfacing with the search software module 110A-X may perform some calculations to obtain the air temperature automatically, or the tracking and reporting software module 140B may do so, via the zip code(s) as disclosed above. Each of these software modules uses a "weather algorithm" to automatically retrieve hour-by-hour temperature readings for the entire year from the closest NOAA reporting station based on the zip code. These hour-by-hour readings are then compared against the actual interior operating environment to produce a much more precise energy savings calculation. When the weather algorithm is a part of the tracking and reporting software module 140B, the computer 135 may generate additional information from simple user inputs relating to the zip code(s) of the existing equipment In an exemplary implementation, the computer 135 uses the zip code to identify the energy configuration from the closest NOAA reporting station. The weather conditions are part of the end-user configurations applied to generate the engineering review report.

The tracking and reporting software module 115A described above may also include a "scheduler algorithm" to automatically conduct an hour-by-hour analysis, through the year, based on the actual operating schedule of the building. The end-user configuration includes their weekly schedule, provided through the search software module 110A or any of the available software modules. The tracking and reporting software module 115A is an easy-to-use interface, which identifies any holidays or potential shut-down periods throughout the year. The end-user schedule is then run through the scheduling algorithm to determine if the building is in-use or not for each of the hours, for every day, throughout the year. When the scheduler algorithm is a part of the tracking and reporting software module 140B, the computer 135 generates additional information from simple user inputs relating to the scheduled uses of the equipment. In an exemplary implementation, the computer 135 uses the simple schedule of use from the end-user configuration to identify any holidays or potential shut-down periods throughout the year. The scheduling conditions are part of the end-user configurations applied to generate the engineering review report.

The tracking and reporting software module 115A described above may also include a "heating and cooling set-point algorithm" to automatically conduct an hour-by-hour analysis, throughout the year, based on the actual operating heating and cooling set-points for equipment in the building, provided by the end-user configuration. The end-user configures the heating and cooling set-points in the search software module 110A, provided to the computer 135. These actual set-points are then combined with the actual schedule, described above, and run through the set-point algorithm to determine if the equipment is operating or not, and the percentage load on the equipment. This calculation is implemented every hour, for every day, throughout the year. When the set-point algorithm is a part of the tracking and reporting software module 140B, the computer 135 generates additional information from simple user inputs relating to the heating and cooling set-point of the equipment. In an exemplary implementation, the computer 135 uses the simple heating and cooling set-points from the end-user configuration to determine if the equipment is operating or not, and the percentage load on the equipment. The heating and cooling set-points conditions are part of the end-user configurations applied to generate the engineering review report.

"Building Envelope" refers to one or more of: insulation levels; windows configuration and arrangement; proportion of exterior walls to interior space; ceiling height and other related building configurations within an end-user location or a different location selected for the project. The building configuration typically impacts the potential energy savings of any given project. The tracking and reporting software module 115A described above may also include a "building envelope algorithm." An exemplary building envelope algorithm is the DOE2 algorithm, based on CBECS (Commercial Buildings Energy Consumption Survey) data. The Department of Energy (DoE) defined prototype building models in the DOE2 algorithm using EnergyPlus® building simulation software. A prototype building may have a defined building type (e.g. office, warehouse, grocery store), a defined size, a defined envelope, a defined operating schedule, one or more defined HVAC equipment type, etc. proposed and existing based on an end-user input for the schedule, the scheduler algorithm overwrites certain schedules in the prototype building model of the DOE2 algorithm. Similarly, based on the climate and the vintage from the end-user, the building envelope algorithm overwrites building envelope characteristics in the DOE2 prototype building model. Additionally, based on the zip code provided by the end-user, the appropriate weather data is applied to the DOE2 prototype building model. Further, for an HVAC system type, the end-user configurations are applied to overwrite the DOE2 prototype building model. When all the end-user configurations have been considered, a revised proposed and existing building model are fed into the DOE2 algorithm. The results are read and scaled in post-processing to determine actual energy savings for a given project.

When the building envelope algorithm is a part of the tracking and reporting software module 140B, the computer 135 generates additional information from simple user inputs relating to the insulation levels; windows configuration and arrangement; proportion of exterior walls to interior space; ceiling height and other related building configuration at the location of the equipment. In an exemplary implementation, the computer 135 uses the simple building envelope inputs from the end-user configuration to generate a customized end-user assessment, based on the climate zone. The building envelope conditions are part of the end-user configurations applied to generate the engineering review report.

Another end-user configuration input corresponds to establishing baseline energy consumption by one or more of the end-user's existing equipment. The search software module 110A-X typically includes an "existing-equipment algorithm," which is configured to categorize each piece of existing equipment as closely as possible without the expense of installing monitoring equipment to establish baselines. Alternatively, the existing-equipment algorithm is a part of the tracking and reporting software module 140B. This allows the computer 135 to generate additional information from simple user inputs relating to the existing equipment. In an exemplary implementation, the computer 135 uses the specifications database 145 to identify the energy configuration over the life of an existing equipment by performing a simple search of the specifications database using the end-user's input description of the equipment.

Each enrollment program is provided from the enrollment program rules software module 140E. The enrollment programs are displayed to the end-user via the application approval software module 160A. The enrollment programs corresponds to energy saving configurations and purchase incentives available for the first equipment. Energy saving configurations for the first equipment may include rules from the enrollment program governing: the energy-efficient second equipment applicable to replace the existing first equipment; energy-efficient components applicable to replace or retrofit the existing first equipment; and conditions specified in a set of second equipment specifications for governing the energy-efficient use of the second equipment. The second equipment specifications are typically a collection of specifications related to the equipment. Such equipment specifications may be pre-defined equipment specific specifications, user-defined specifications, or a combination of the pre-defined and user-defined specifications. Exemplary equipment specifications may include set-point specifications, weather condition specifications, schedule specifications, purchase incentives, and energy savings and demand consumption values. Further, the energy savings value of exemplary equipment is an example of a combination of user-defined and pre-defined specifications. The energy savings value is determined by multiplying the energy demand consumption values with the hours of operation of the exemplary equipment. This resulting multiplied value is added to the equipment specifications for the exemplary equipment.

The system 100 includes a communication network 130 for transmitting the end-user configurations from the respective first computer 105A-X to a second computer 135. It is appreciated that the second computer 135 may include one or more remote computers, each remote computer for executing one or more of the software modules 140A-E. In such an implementation, the software modules 140A-E may be on independent computers, all connected to the second computer 135, via a communication network, similar to communication network 130. Further, the communication network 130 may include an IEEE 802.11 wireless standard network; a BLUETOOTH standard wireless network; a radio communication standard network; a Near Field Communication (NFC) standard network; a cellular GSM, CDMA, 3G, or 4G wireless network; or a wired Ethernet standard network.

A specifications database 145 is in electronic communication with the computer 135 and provides one or more equipment specifications to the computer 135. Electronic communications include a standard two-way communication network, similar to the communication network 130. The specifications database 145 is, in part, an exhaustive database of all manufacturers' equipment specifications organized in a way that allows the enrollment program rules software module 140E to generate program rules that are evaluated for energy savings in a precise manner. End-users may select old equipment for proposed replacement or new equipment to replace the old equipment; or components to retrofit existing equipment. The specifications database includes a limited selection of general descriptions of the existing equipment that are applicable to determine a reasonable match to an end-user's existing equipment. The search software module 110A-X provides the end-user with the selection capability, by make and model number. Matching the existing equipment ("first equipment") with proposed replacement equipment ("second equipment") allows search software module 110A-X or 140C to retrieve information related to each of the first and second equipment. This information is part of the equipment specifications for the first or second equipment. The second equipment corresponds to more energy-efficient upgrades proposed for a selected existing equipment.

Further, an end-user may select to retrofit an existing equipment using a new or a different components; or obtain a purchase incentive, such as an interior rate incentive, an exterior rate incentive, an equipment type incentive, or an operating entity incentive offered by an entity, such as an energy supply utility company, the equipment/component manufacturer, or a government agency. Such incentives provide the end-user with the motivation to replace or retrofit existing equipment with more energy-efficient alternatives. The purchase incentive information is also provided from the specification database 145 and may be updated frequently by the entity providing the incentive. In one example, an equipment manufacturer, a utility company, or a government agency may provide incentives to the end-user. The result of using the comprehensive specifications database 145 is that the values for energy consumption of the new equipment are exactly what the manufacturer has demonstrated through exhaustive testing to industry standards. This allows the energy savings calculation to be much more precise.

For lighting alone, the specifications database 145 may include over 630 manufacturers of lamps and fixtures, producing hundreds of thousands of equipment and component configurations. Further, the energy consumed by these equipment and components depends on how they are configured at the time of construction. In an exemplary implementation, the voltage of the wiring chosen for the equipment or component, as well as the photometric efficiency within which the fixtures are installed, are typically useful in making a determination for the projected energy consumed by the overall structure, which forms an exemplary "equipment" in this disclosure.

Each equipment specification from the specifications database 145 is typically governed by rules from the enrollment program rules software module 140E. The equipment specification also corresponds to the second equipment, which is the proposed replacement to the first equipment listed in the end-user configurations. Each equipment specification may include one or more of: an energy savings and demand consumption values for the equipment; one or more purchase incentives offered by one or more entities related to the equipment; an attribute value corresponding to a demand consumption value of each component in the equipment; and one or more eligibility rules for determining if the equipment qualifies for one or more prescribed measures corresponding to one or more purchase incentives. Any energy savings associated with one or more equipment are the result of the applied program rules, as energy savings are dependent on the existing equipment and the hours of operation.

A demand consumption value for the selected enrollment program is estimated using the equipment and components, as well as the configuration of these equipment and components, all described in the end-user configuration. The search software module 140C is responsible for accessing the extensive specifications database 145 and for identifying the actual equipment and component energy consumption for the particular configuration. By way of an example, for retrofitting existing equipment using existing configurations, the end-user generates the end-user configuration for the project location where the equipment operates. The end-user configuration includes a selection of an enrollment program, for e.g., an equipment-type incentive program. The end-user configuration also includes a selection of the existing equipment and the component to be retrofitted, as well as the environmental conditions of the project location. It is appreciated that the end-user configuration is manually entered for the existing equipment information via the respective reporting or search software module 115A-X or 110A-X; while the environmental conditions may be automatically gathered using the software sub-modules 125A-X located at the project location and is sent to the respective application and approval software module 160A-X. The equipment information and the environmental conditions are combined together, prior to being sent for approval to a different software module on the same or a different computer. It is appreciated that the combined automatic and manual entries in the end-user configurations is an exemplary hybrid entry in the system 100. When a single computer is capable of performing the approval process, appropriate equipment specification data for the proposed replacement equipment/commodity is extracted from the specifications database connected to the single computer; the approval rules are applied from the respective application and approval software module 160A-X to the end-user configuration; and an instant approval is received by the end-user. If a different computer is applied, a counterpart respective application and approval software module, such as 140D, provides instant approvals or pre-approvals to the end-user.

The search software module 140C typically matches the first equipment to a second equipment; or a first component to a second component for the first equipment from the end-user configuration. Here, as throughout this disclosure, the first equipment/commodity refers to existing equipment/commodity, while the second equipment/commodity refers to proposed energy-efficient replacement equipment/commodity. The matching of components within the first equipment is primarily meant for retrofitting the existing equipment. The component to be retrofitted and the retrofitting enrollment program selection is made in the end-user configuration to match the information in the specifications database 145. The search software module 140C is responsible for accessing the extensive specifications database 145 and for identifying the second equipment or component that has an energy consumption for the particular configuration, and for a particular enrollment program. After identifying a match in the selected equipment and component that qualify for the equipment-type incentive enrollment program, search software module 140C retrieves the manufacturer's data for the equipment and the component, and the values of energy consumption for each. The energy savings value for the selected component-type incentive enrollment program is estimated using the selected equipment and components. The proposed configuration of these equipment and components are retrieved from specifications database 145. A demand consumption value for the equipment is determined from the scheduling, set-points, and other algorithms, per the end-user configuration. One or more purchase incentives are retrieved from the specifications database 145 relating to the equipment-type enrollment program.

In an exemplary implementation, the purchase incentives are customizable in the specifications database 145. In this regard, the entity offering the purchase incentive may provide an efficient energy service provider with generic or fully customizable data structure of purchase incentives for considerations. These purchase incentives and their application to an end-user's application form will be handled without the end-user's involvement. When an end-user intends to submit a new project for approval, the end-user may fill the forms provided via the invoicing and application approval software modules 120A-X and 160A-X. FIG. 4 is an illustration of an exemplary user-interface within the application approval software module of an end-user's computer, for providing account and general project information for an end-user. The account and general project information is typically a part of the end-user configurations, but may be provided independently. Application information from form 400 is provided to the application approval software module 140D of the computer 135. An automated or manual reviewer of the enrollment program will reconcile the end-user configurations, resulting in a simpler submittal process for the end-user and significant time savings in the review process. Approval rules may be stipulated in the application approval software module 140D. The approval rules are applied, along with the enrollment program rules, to ensure that the retrieved component specifications meet the set of rules. Tracking and reporting software module 140B ensures that the applied end-user's equipment is functioning within the scope of the end-user configurations submitted from the application and tracking and reporting software modules 160A and 110A. The engineering review report received by the computer in response to the end-user configurations submission for approval may also include an instant approval or pre-approval certification provided to the end-user.

In an example, many programs offer different purchase incentive rates, such as an interior rate or an exterior rate; equipment rate or component type, a rate dependent on such factors as the type of T8 lamp/T5 lamp component used in a lighting equipment; or by an operating entity, within a given utility. Different purchase incentive structures are provided via the application approval software module 140D or a search software module 140C. By way of an example, purchase incentives are provided per piece of equipment; per unit size of a piece of equipment, such as per ton of cooling; and per energy saved, such as per kWh or per kW. Further, one or more entities may offer a hybrid mix of incentive rates and/or structures within a given enrollment program, which will typically require discovery via an engineering review report.

Further, the equipment specifications include attribute values, which are calculated or retrieved from the specifications database 145. The attribute values correspond to a demand consumption value of each component in the equipment. For example, a lighting retrofit may require that a new fixture include initial lamp lumens above a certain value (lamp attribute), have an instant start ballast (ballast attribute), and exceed a certain lumens per Watt efficacy requirement (combination of lamp and ballast attributes). The specifications database 145 includes the entities' specifications for all the equipment and components. These attribute values are governed by rules from the enrollment program rules software module 140E, the application approval software module 140D, and the search software module 140C. The entities that manufacture the equipment and components provide detailed manufacturing specifications, which are stored in the specifications database. The manufacturing specifications are mapped to generic or customized rules for all of the prescriptive rules validation. These rules are available to the software modules. A regional governing agency may provide other rules pertaining to the regional laws for use of certain equipment, thereby creating a robust rules engine, with a collection of generic and fully customizable software modules 140C-E. The rules engine allows for all of the prescriptive rules validation to take place automatically. Where allowable by regional or state rules in the region of the end-user's equipment, equipment that fails to meet any of the prescriptive rules is automatically routed through custom energy savings and incentive calculations.

Figure 6:
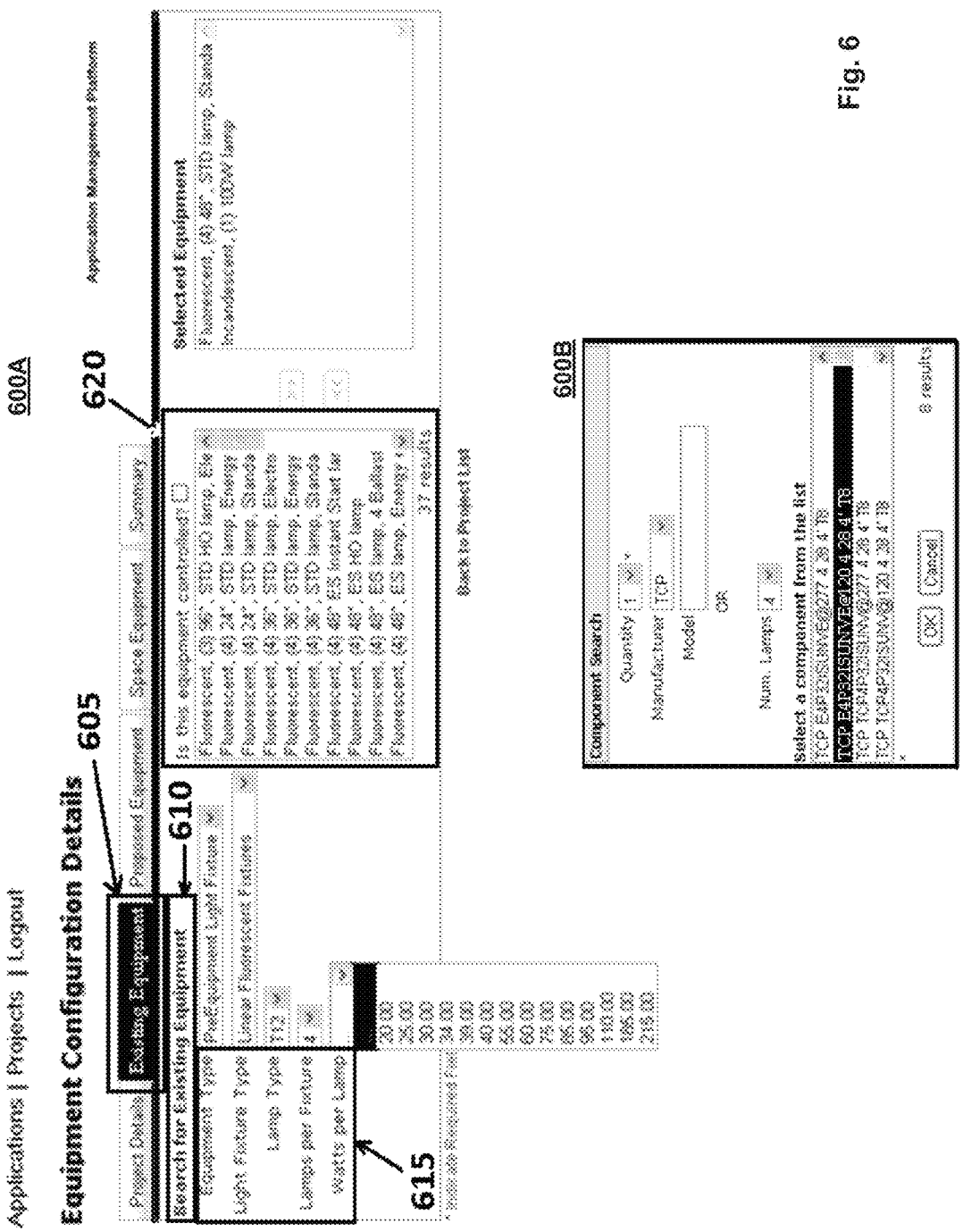
FIG. 6 is an illustration of exemplary user-interface pages within the search software module, of an end-user's computer, for providing end-user configuration.

In an exemplary implementation, the search and application approval software modules 110A and 160A include user-interfaces, with built-in rules and an error-checking engine, which are supported by the rules from the enrollment program rules software module 140E and the search software module 140C. These rules make it impossible to configure or submit an incomplete application, or receive an incorrect estimate. These rules may be applied to a thin-client software module that executes the user-interface component of system 100. In one example, FIG. 6 is an illustration of user-interface pages within the search software module, of an end-user's computer, for providing end-user configuration. A selection of equipment by the end-user generates a list of matching equipment 620 from the specifications database 145. The end-user may not provide information that does not match the exhaustive collection of equipment and components listed in the database. The result is that an end-user can receive energy savings and incentive numbers via the engineering review repot from the system and method disclosed herein, with certainty that the report is pre-validated, error-free, and will not change, as long as there are no changes made to the project.

The equipment specification further includes one or more eligibility rules for determining if the equipment qualifies for one or more prescribed measures corresponding to one or more incentive programs, offered by the one or more entities. Individual governing states typically apply different rules regarding equipment eligibility. The application approval software module 140D may include these rules and may also enforce these rules. While in some governing states, the basic requirement may be that the new equipment saves energy, as compared to the old equipment, others have specific requirements. In one example, equipment certifications are required to implement a new equipment within the regional area of the governing state. Exemplary prescribed measures include an equipment certification related prescribed measure and a minimum performance related prescribed measure. The equipment certification prescribed measures include compliance with one or more of: an EnergyStar® certification, a Consortium of Energy Efficiency® (CEE) certification, and a DesignLights Consortium® (DLC) certification, while the minimum performance certification prescribed measures include compliance with one or more of: an Efficiency Energy Ratio (EER) a Coefficient of Performance (COP), and a fixture efficiency. The application approval software module 140D verifies that a given piece of equipment qualifies for one or more of these prescribed measures, depending on governing state. In an exemplary implementation, the application approval software module 140D automates the eligibility determination through a series of "thumbs up/thumbs down" checks. This automated approach makes the process near instantaneous and provides a consistent methodology ensuring that all applicants are treated identically.

The second computer 135 includes configuration for calculating an invoicing statement corresponding to the end-user configuration and the second equipment identified by the search software module 140C. The invoicing software module 140A includes reconciliation tools to allow the end-user to reconcile their invoices. Further, the invoicing software module 140A generates the invoicing statement to include a bill of materials for the second equipment. The invoicing software module 140A also allows users to enter a quantity and unit cost for each piece of second equipment in fields within the invoicing statement. The total is summed to determine the maximum allowed potential purchase incentive. The program rules dictate the allowable cap for maximum allowed purchase incentives. In an implementation, the cap could be 100%, 50%, or any other multiplier of the total. Rules also determine, by jurisdiction, whether additional items, such as labor, miscellaneous materials, disposal costs, etc. may be summed total of the unit costs.

The second computer 135 also includes configuration for preparing an engineering review report for the equipment. The engineering review report is prepared at the search software module 140C, and typically includes the energy savings value, the invoicing statement, and a mapping of the second equipment to one or more of the second equipment specifications. The second computer 135 is configured to transmit the engineering review report, via the communication network 130, to the respective first computer 105A-X. The engineering review report enables the end-user to access engineering review of the energy savings realized by replacing the one or more first equipment with the one or more second equipment. Further, the engineering review report is an instant approval or pre-approval certification provided to the end-user for use of the second equipment to replace the first equipment. The engineering review report may include a spreadsheet, DOE2 input and output files for their project, energy savings value, purchase incentives, bill of materials, equipment to be replaced, etc. This listing of summary values may also be stored on the end-user's computer or a different computer.

In an exemplary implementation, the software modules 110A, 115A, 120A, 160A, 165A, sub-module 125A, and the first computer 105A, together form an implementation of a computer-readable code product that is configured to perform engineering review of energy consumption by one or more equipment. Here, the software modules 110 A, 115A, 120A, 160A, 165A, sub-module 125A are fully functional software modules, capable of performing complex computing tasks. Alternatively, in another exemplary implementation, the software modules 110A, 115A, 120A, 160A, 165A, and sub-module 125A may be thin-clients or computing software modules, and are part of a partially or completely downloaded webpage on a computer accessible to the end-user. The webpage is connectable to the internet and is also connectable to one or more automated software sub-modules 125A residing either on the end-user's computer or a third computer. The partially or completely downloaded webpage forms an implementation of a computer-readable code product that is configured to perform engineering review of energy consumption by one or more equipment.

Alternatively, in yet another exemplary implementation, the software modules 110A, 115A, 120A, 160A, 165A, and sub-module 125A may be thin-clients or computing software modules, and are part of a software program downloaded from the internet to the first computer 105A, the first computer being accessible to the end-user. The software program is configured as a stand-alone internet application and is connectable to one or more automated software sub-modules residing either on the end-user's computer or a third computer. The downloaded software program forms an implementation of a computer-readable code product that is configured to perform engineering review of energy consumption by one or more equipment.

Alternatively, in another exemplary implementation, the software modules 110A, 115A, 120A, 160A, 165A, sub-module 125A may be thin-clients or computing software modules, and are part of a software program received as a memory product and installable on a computer accessible to the end-user. The software program is configured as a stand-alone internet application and is connectable to one or more automated software sub-modules residing either on the end-user's computer or a third computer. The installed software program forms an implementation of a computer-readable code product that is configured to perform engineering review of energy consumption by one or more equipment.

It is appreciated that, in each of the alternatives described above, the software modules 110 A, 115A, 120A, 160A, 165A, sub-module 125A, and the computer 105A are in electronic communication with computer 135; the software modules 110 A, 115A, 120A, 160A, 165A, and sub-module 125A are thin-client or computing software modules, the thin-client software modules configured to send end-user configurations to the computer 135 and receive an engineering review report at the first computer 105 A. The software modules 140A-E on computer 135 are computing software modules for performing the computing functions for the received end-used configurations and for generating the engineering review report. The end-user is provided a user-interfaces to interact with each of the software modules 110A, 115A, 120A, 160A, 165A, and sub-module 125A on the first computer. It is also appreciated that the functions of the thin-client software modules may be combined with the computing software modules for full functionality on a single computer 105, connected to a specifications database 145.

In an exemplary implementation, the computer-readable code is loaded to a first computer and includes code for one or more software modules 110A, 115A, 120A, 160A, 165A, and 125A. The software modules 110A, 115A, 120A, 160A, 165A, and 125A includes user-interface for receiving, from an end-user, a request for end-user configurations corresponding to one or more first equipment, and a selection of one or more enrollment programs. Each equipment is directly or indirectly configured to consume energy from one or more energy sources. Each enrollment program corresponds to energy saving configurations for the first equipment. Further, the software modules 110A, 115A, 120A, 160A, and 125A on the computer 105 are configured for receiving an engineering review report responsive to the end-user configurations. The engineering review report is provided to the end-user via the user-interface, thereby enabling the end-user to access engineering review of the energy savings realized by replacing the one or more first equipment with the one or more second equipment. Further, the engineering review report is an instant approval or pre-approval certification provided to the end-user for use of the second equipment to replace the first equipment.

Figure 2:
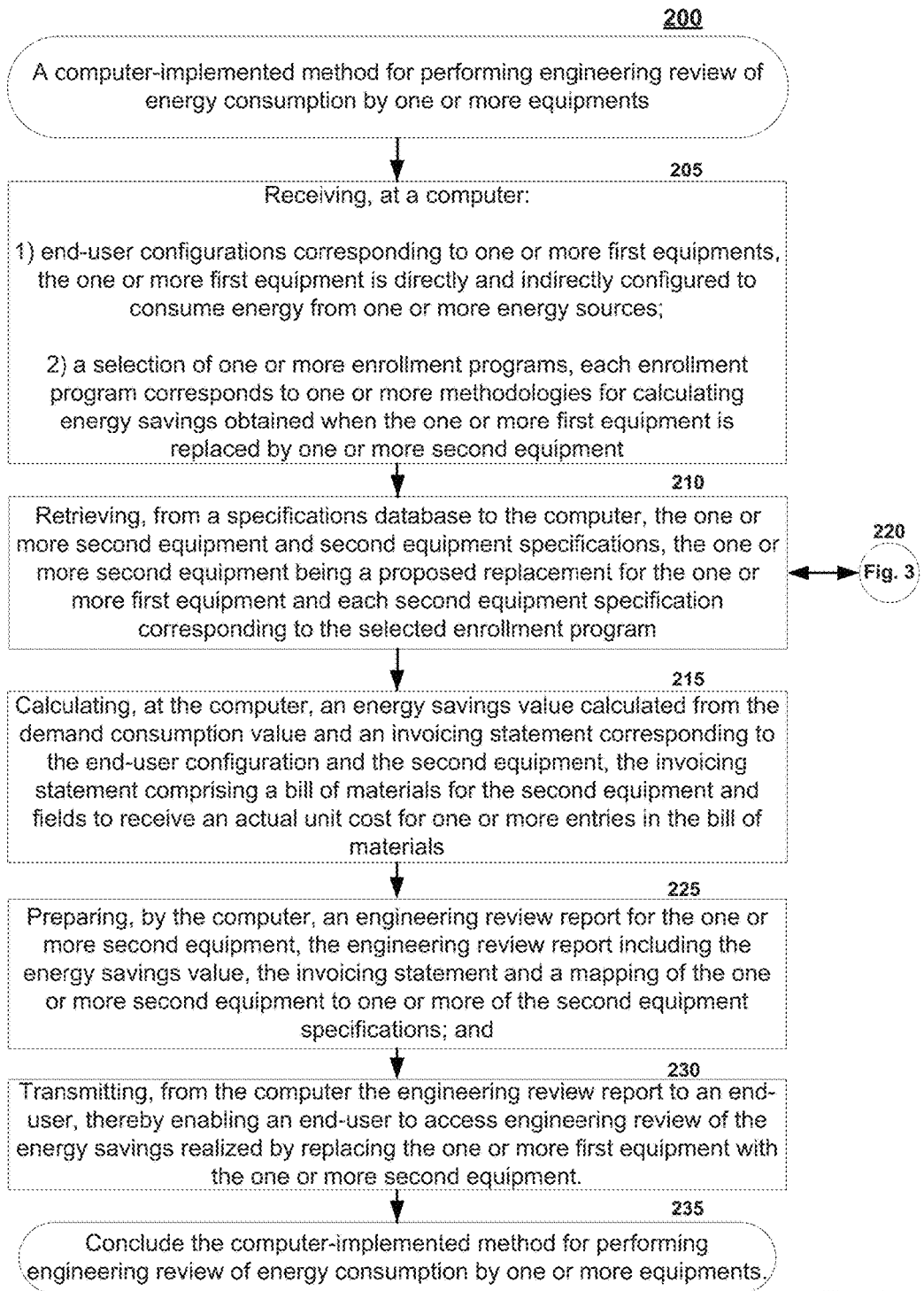
FIG. 2 illustrates an exemplary computer-implemented method for performing engineering review of energy consumption by one or more equipment.

FIG. 2 illustrates an exemplary computer-implemented method 200 for performing engineering review of energy consumption by one or more equipment. At block 205, the computer-implemented method includes a computer for receiving end-user configurations corresponding to one or more first equipment. Each first equipment is directly or indirectly configured to consume energy from one or more energy sources. Further, the computer receives selections made by the end-user for one or more enrollment programs. Each enrollment program corresponds to energy saving configurations for the first equipment. At block 210, the retrieving step retrieves one or more second equipment and second equipment specifications. Each second equipment is a proposed replacement for each respective first equipment. Each second equipment specification corresponds to the selected enrollment program. The retrieving step is performed via block 220, which extends to FIG. 3, and which describes steps for retrieving one or more equipment specifications. At block 215, a calculating step is disclosed, for calculating by the computer, an invoicing statement corresponding to the end-user configuration and the second equipment. The invoicing statement includes any second equipment proposed to replace one or more first equipment, for the end-user project; the first equipment; fields to receive an actual unit cost for one or more entries in the bill of materials; and an expected savings from the selected enrollment program. Further, the calculation methodology is typically repeatable, instantaneous and pre-validated, resulting in substantial cost savings in any enrollment program, and contributes to a dramatic increase in turn-around time for the end-user.

At block 225, a preparing step is disclosed, for preparing, by the computer, an engineering review report for the second equipment. The engineering review report includes the energy savings value, the invoicing statement, and a mapping of the second equipment to one or more of the second equipment specifications. At block 230, a transmitting step transmits, the engineering review report from the computer, via the communication network 130 to any recipient source. If the implementation is via a split software module architecture, using a thin-client software module and a computing software module, on a first and second computer respectively, then the second computer may perform the computing steps for each software module. After the computing steps are complete, the second computer transmits the engineering review report to the thin-client software module on the first computer for display via the user-interfaces of the thin-client software module. The engineering review report enables the end-user to access engineering review of the energy savings realized by replacing the one or more first equipment with the one or more second equipment. Block 235 concludes the computer-implemented method 200 for performing engineering review of energy consumption by one or more second equipment. Further, the engineering review report is an instant approval or pre-approval certification provided to the end-user for use of the second equipment to replace the first equipment.

Figure 3:
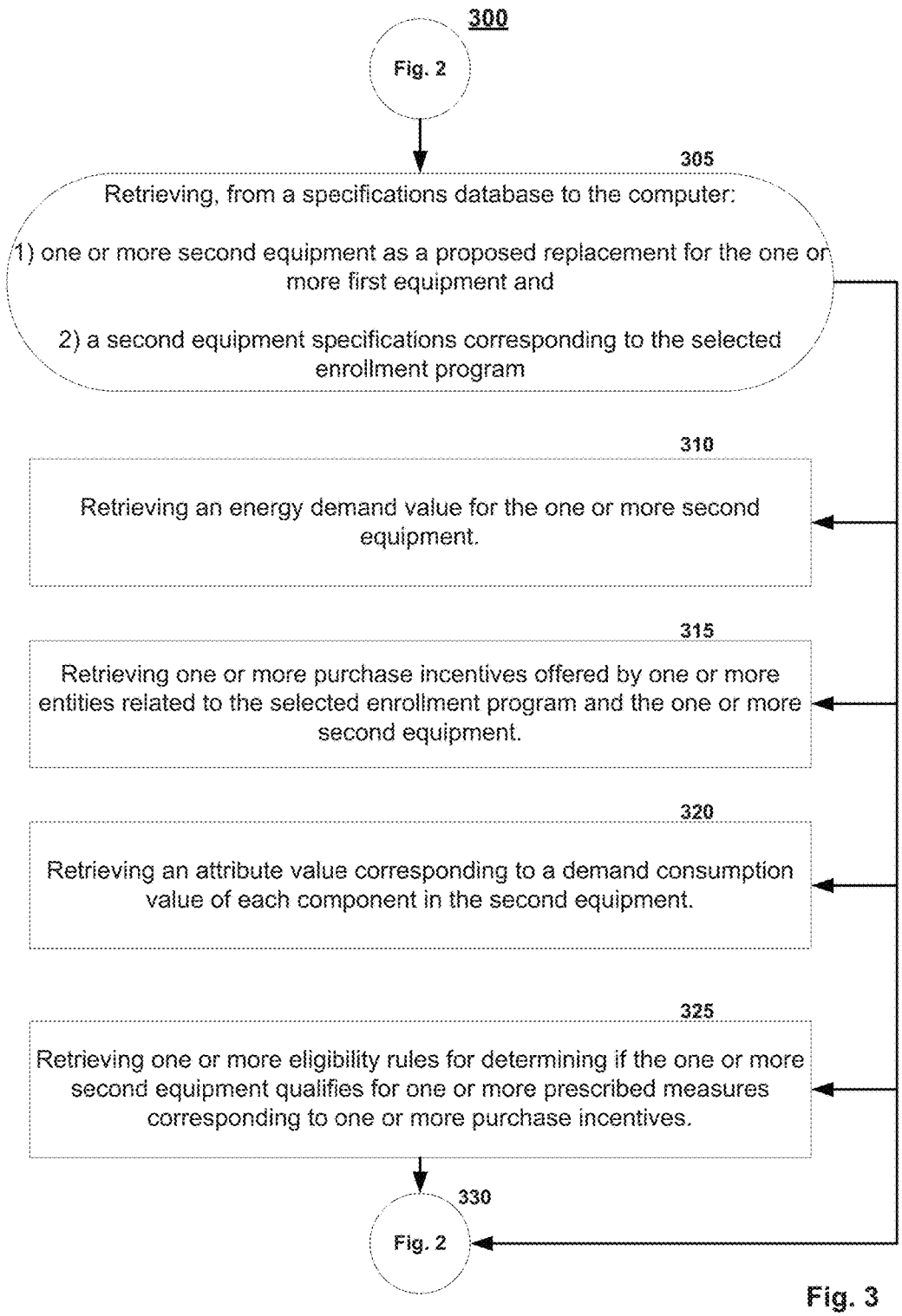
FIG. 3 illustrates an exemplary computer-implemented method for retrieving one or more equipment specifications.

FIG. 3 illustrates an exemplary computer-implemented method 300 for retrieving one or more equipment specifications. FIG. 3 discloses the steps involved in completing functions for block 220 of FIG. 2. Specifically, in an exemplary implementation, the second equipment specifications retrieved from the specifications database may include one or more parts. Block 305 discloses a retrieving step for one or more second equipment specifications from a specifications database to the computer. Each second equipment specification corresponds to the selected enrollment program and the second equipment, which is proposed to replace the first equipment cited in the end-user configurations. At block 310, a retrieving step is disclosed for retrieving a demand consumption value and an estimated energy savings value for the second equipment. The values are typically provided by a manufacturing entity for the equipment and component, and are stored in the specifications database as described with respect to FIG. 1. Further, a savings calculation algorithm in the search software module 140C or 110A-X of FIG. 1 allows for any combination of existing equipment to be replaced by any combination of proposed equipment. At block 315 the retrieving step retrieves one or more purchase incentives offered by one or more entities related to the selected enrollment program. At block 320, the retrieving step retrieves an attribute value corresponding to a demand consumption value of each component in the second equipment. At block 325, the retrieving step retrieves one or more eligibility rules for determining if the equipment qualifies for a prescribed measures. At block 330, control of the computer implemented method 300 is transferred back to FIG. 2.

FIG. 4 is an illustration of an exemplary user-interface 400 within an invoicing software module 120A of the end-user's computer, for providing account or general project information for an end-user. The "Customer and Project Information" form is a form-based user-interface that is part of the invoicing or tracking and reporting software modules 115A-120A. The invoicing or tracking and reporting software modules 115 A-120A uses the form for securing user information of a new end-user; a customer for an end-user, if the end-user is a contractor, or a new project. The "Customer and Project Information" form is a static interface of the search software module 110 A. Further, the form interface is illustrated as a stand-alone internet based user-interface within the application window 155.

Alternatively, the form interface is part of a webpage in a browser, the browser functioning as the application window 155. In the browser application window 155, the form interface part of the webpage is downloaded to the first computer 105A, either partially or completely, for the purposes of collecting end-user configuration. In an exemplary implementation, the form is executed as a JAVA (a programming language) based interface, in the stand-alone application, or as a JavaScript API in a webpage. The form allows the end-user to provide location information relating to the equipment, such as the governing state 420, zip code 410, and a selection of one or more projects 405 at the equipment location. The end-user may submit the form to the second computer 135 by the clicking on the "submit" button 415.

The application approval software module 160A typically coordinates each of the software modules 110A-125A during the initial application or enrollment process. This ensures that the end-user finds the right existing equipment on the search software module 110A; provides accurate environmental conditions via the tracking and reporting software module 115A; receives accurate invoicing information via the invoicing software module 120A; and provides appropriate updates via the software sub-module 125A.

Figure 5:
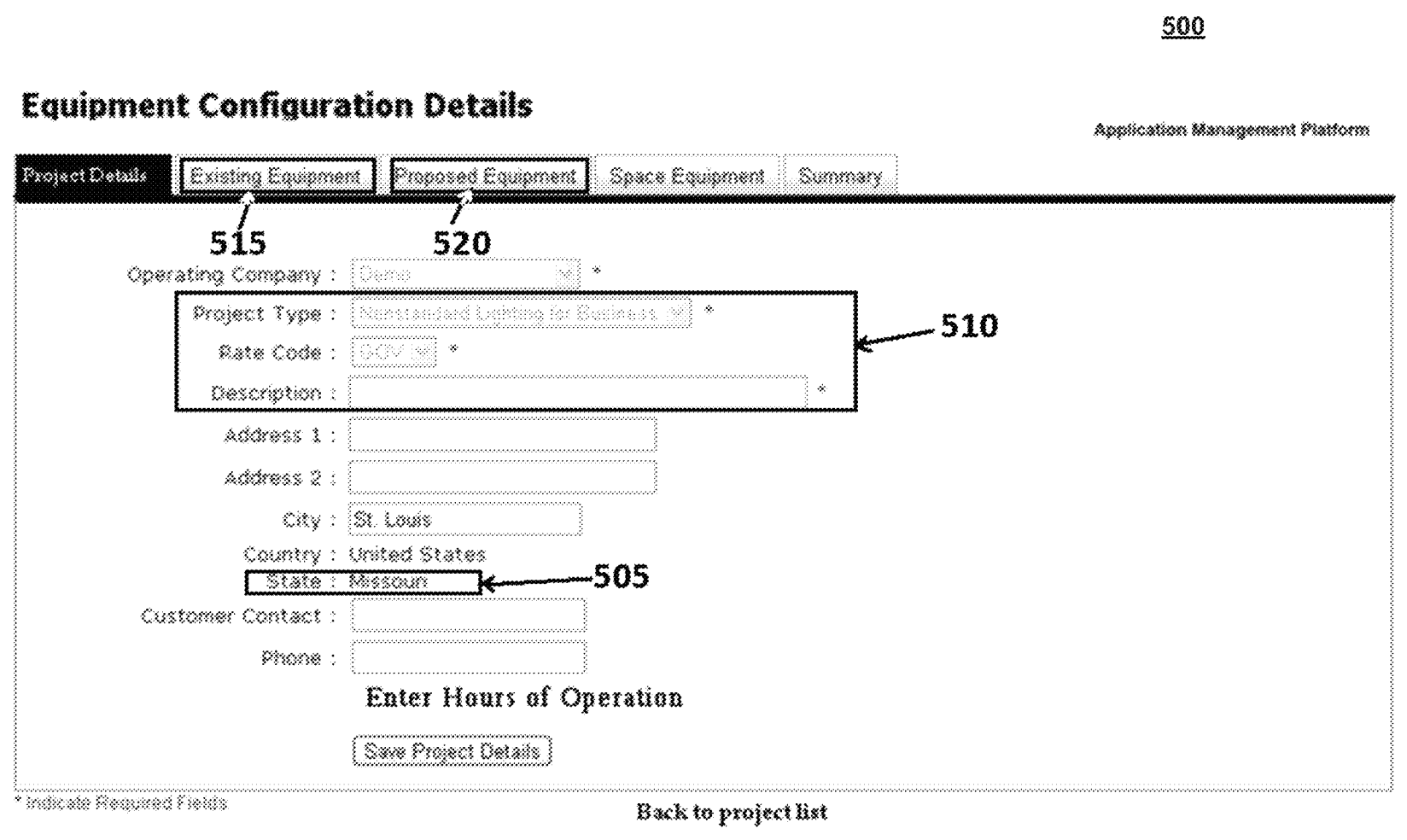

FIG. 5 is an illustration of an exemplary user-interface tab 500 within the reporting or invoicing software modules 115A-120A of the end-user's computer, for providing end-user configuration. Similar to the user-interface 400 of FIG. 4, the "Equipment Configuration Details" tag provides the end-user with capabilities to describe equipment at a location different from the end-user location. This is applicable for a contractor-type end-user, who has multiple clients at different project locations. The governing state 505 is the state where the equipment is located. The project type, described with respect to form 400, is now detailed further via form fields 510. Further, the "Equipment Configuration Details" tab 500 provides the end-user with space to describe the existing equipment 515 and proposed equipment 520 at the current location of the equipment.

FIG. 6 is an illustration of exemplary user-interface pages 600A and 600B within the search software module of an end-user's computer for providing end-user configuration. The user-interface page 600A illustrates first equipment choices available to the end-user. The first equipment choices allow the end-user to define the existing equipment at the end-user's location by industry standard identifications. For e.g., 610 lists first equipment choices by program selection (e.g. lighting, HVAC) and then a series of logical filters that are provided to narrow the list to a manageable number of choices in the center panel 620. The user-interface page 600A allows an end-user to provide detailed information for existing equipment 605 in the fields provided, such as 615 and at user-interface page 600B. The user-interface page 600A is an interface, which allows an end-user to search, in real-time, for system-specific equipment comparable to the existing equipment at end-user's project location. When the user has provided information for fields under the search header 610, the user-interface page 600A immediately generates a list of matching equipment 620. This listing process prevents any errors from mismatched equipment in the energy consumption calculation in the final engineering review report for the selected enrollment program. The user-interface page 600B illustrates second equipment choices available to the end-user. The second equipment choices allow the end-user to define the proposed equipment at the end-user's location down to the exact make and model number corresponding to one or more components within the equipment.

Figure 7:
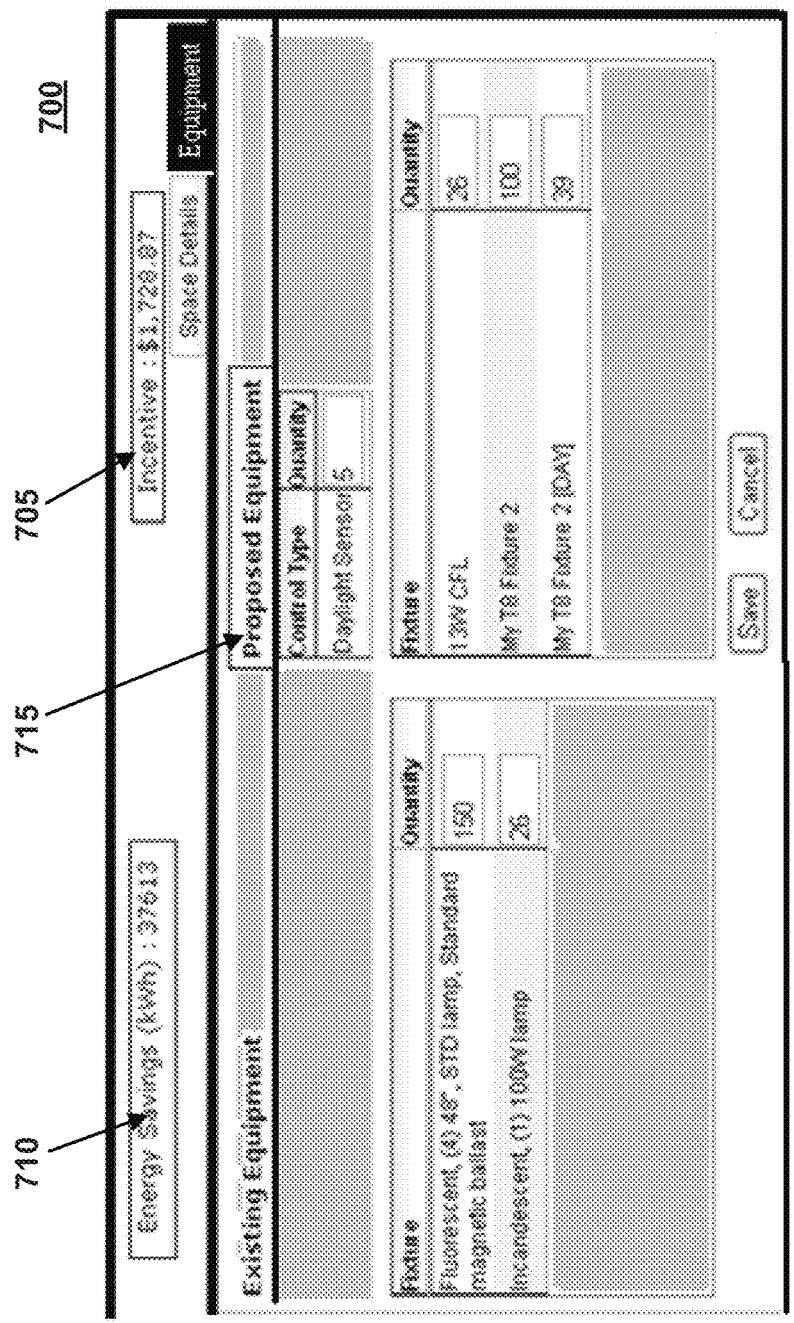
FIG. 7 is an illustration of an exemplary user-interface page within the tracking and reporting software module of an end-user's computer, for providing end-user configuration.

FIG. 7 is an illustration of an exemplary user-interface page 700 within the tracking and reporting software module on an end-user's computer for receiving an engineering review report. The user-interface page 700 provides the end-user with information about proposed equipment, based on analysis of the existing equipment provided by the end-user in the end-user configurations. Multiple pages may exist in the engineering review report, each page providing relevant information as part of the engineering review report. Some of the pages include the equipment specifications retrieved from the specifications database 145, while other pages may cover the invoicing statement part of the report. In FIG. 7, an energy savings value is provided in kilo Watt hours (kWh) 710 for the proposed equipment, as against the existing equipment. Further, the purchase incentive is offered as a monetary savings value of $1,728.87 in block 705. The proposed equipment in described in section 715, along with proposed components for the equipment, listed under "Fixtures."

FIG. 8 is an illustration of an exemplary user-interface page 800 within the software module 115 A, on an end-user's computer, for providing interactive effects from area cooling, as well as the building envelope configurations from the area description of the equipment location. Reducing energy consumption within a space reduces heat generation within the space. As an example, when the space is cooled by air conditioning, there are interactive effects where there additional savings are realized from the reduced cooling load on the air conditioner. The user-interface page 800 provides the end-user with detailed fields requesting space equipment configurations at the project location. The area description in block 805 provides information corresponding to the type of area cooled by one or more equipment at the location. The hours of operation field 810 allows the end-user to provide schedule of operation information to the computer. Together, fields in 805 and 810 provide inputs to the building envelope algorithm and the scheduler algorithms disclosed above.

In an exemplary implementation, each of the weather algorithms, the schedule algorithm, the set-point algorithm, and the building envelope algorithm from the tracking and reporting software module 140B of FIG. 1 or the sub-modules 125A, are available in the specifications database as 145, and are updated regularly by manufacturing entities. The algorithms take into account any uniform or non-uniform specifications pertaining to one or more governing states, where the end-user's equipment exists.

FIG. 9 is an illustration of an exemplary user-interface page 900 within the software module of an end-user's computer for receiving a bill of materials and an engineering review report. The user-interface page 900 is an exemplary page, which typically includes information from the invoicing statement part of the engineering review report. Tabs 905 and 910 allow an end-user to scroll through the engineering review report and review suggested changes in equipment, purchase incentives, and additional energy savings for a year. At block 915 the incentives and energy saving values are presented. At block 920, the existing equipment provided by the end-user in the end-user configurations is presented. At block 925, the proposed equipment is presented in a bill of materials for the end-user. This is a summary of the purchase incentives provided.

Figure 10:
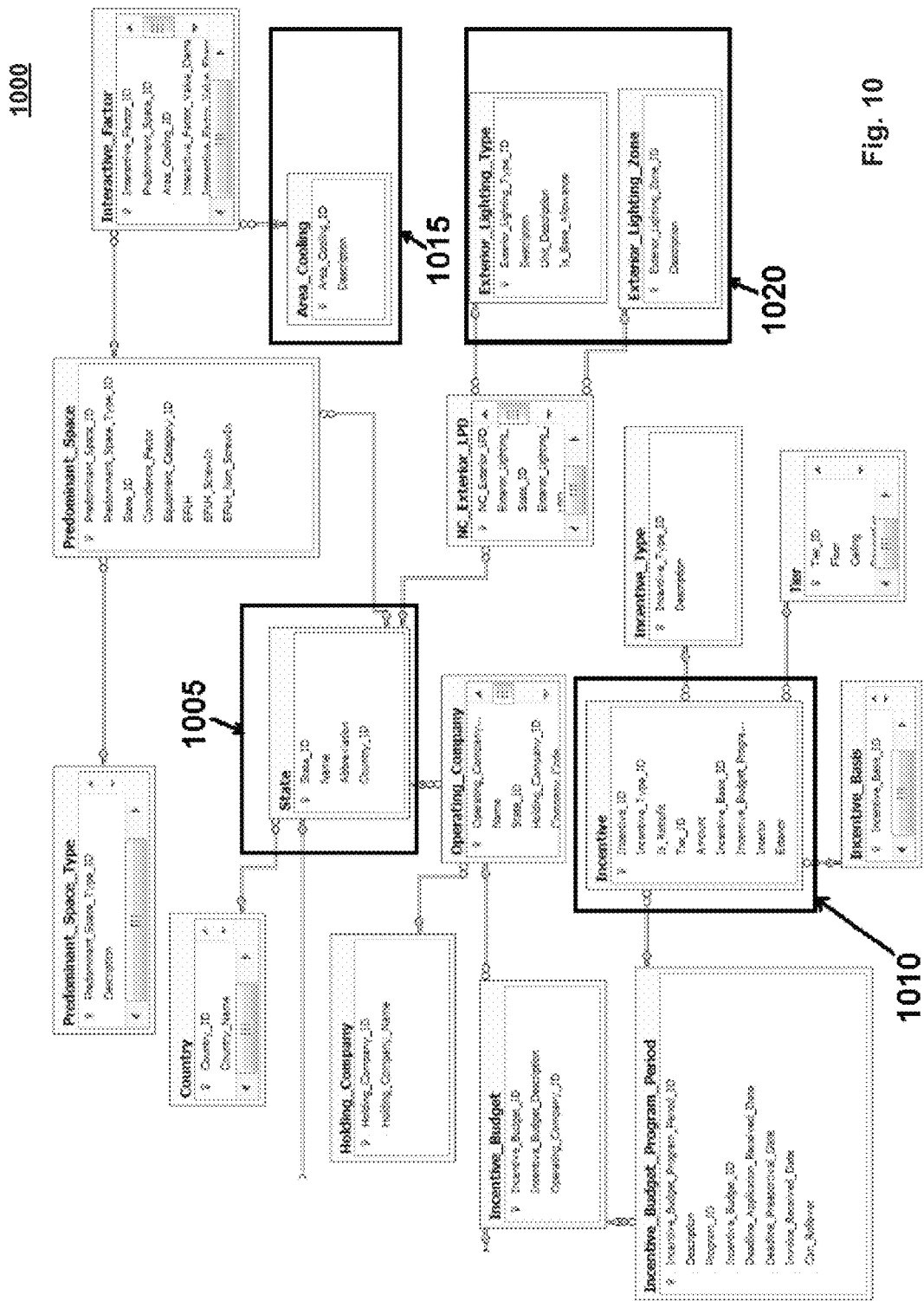
FIG. 10 is an illustration of a section of an exemplary specification database architecture.

FIG. 10 is an illustration of a section of an exemplary specification database architecture. In an exemplary implementation, the specifications database is a MySQL and RDBMS database. The governing state where the project equipment is located is illustrated via block 1005, which stores the state information, and links the state information to the operating company and to other relevant database records. Further, the incentive database record 1010 is linked to an incentive budget within the enrollment program, and an incentive type database record. The area cooling interactive effects information is stored via the exemplary database records in block 1015. Additional information related to the exterior equipment for a project is stored via exemplary database records 1020. The exemplary equipment in this case is exterior lighting fixtures.

FIG. 11 is an illustration of an exemplary user-interface section 1100 of the invoicing statement that has been reconciled by an end-user, in accordance with this disclosure. The exemplary user-interface section 1100 is the bill of materials 1105 part of the invoicing statement. Further, the user-interface section 1100 is presented to the user as part of the engineering review report. The user-interface page 1100 includes fields to receive an actual unit cost 1115 for one or more entries 1120 in the bill of materials. The quantities 1110 of each entry are also listed and the total costs to the end-user or contractor is provided via this invoice user-interface. The data in invoicing statement 1100 may alternatively be presented to the end-user in an excel spreadsheet. This typically occurs after an end-user has reconciled invoices through the user interface software modules. Data in the invoicing statement include an invoice date for the equipment, and the vendor of the equipment or components. It is appreciated that the equipment and components displayed in the invoicing statement 1100 are equipment and components that match the user selection provided at the end-user configurations. The proposed equipment and components are responsive to the existing or intended equipment and components provided by the end-user via the end-user listing of components.

In other exemplary implementations, the energy savings value for the equipment in the specifications database is generated by storing and re-calculating, in real-time, the actual demand consumption values for the one or more second equipment from other users of the second equipment, other than the end-user. Further, in some exemplary implementations, the demand consumption value for the equipment in the specifications database is generated by storing and re-calculating, in real-time, the actual demand consumption values for the second equipment from other users of the second equipment, other than the end-user. In yet other exemplary implementations, the purchase incentives are stored and updated in the specifications database, in real-time, as the purchase incentives change over time. In an implementation, the attribute value, in the specifications database, corresponds to a demand consumption value of each component in the equipment.

Further, in other exemplary implementations, the equipment specification in the specification database is available for one or more of: different geographical locations based on the weather stations; different hours of operation; different set points; building envelope and baseline designs; different manufacturers' specifications; and for any combination of the component within the equipment, if the component had to be replaced by one or more new components. Other exemplary implementations include configuring the specification database for selective availability by the end-user using the first computer. In one exemplary implementation of the selective availability of the specification database, one or more search software modules on the computer allows the end-user to access the purchase incentives and the manufacturers' specifications for the equipment, as well as the components within the equipment.

In other exemplary implementations, the end-user configurations is received on the at a search software module on the computer, and is then transmitted to a different computer. In yet another exemplary implementation, the engineering review report is updated in via a tracking and reporting software module resident on the computer. The tracking and reporting software module transmits the engineering review report, in real-time, to a counter-part tracking and reporting software module resident on the different computer. In another exemplary implementation, a first invoicing module is resident on the computer for providing customer relationship management (CRM) service, energy consumption information, and energy consumption costs to a counter-part invoicing module resident on a different computer.

EXAMPLE

Figure 12:
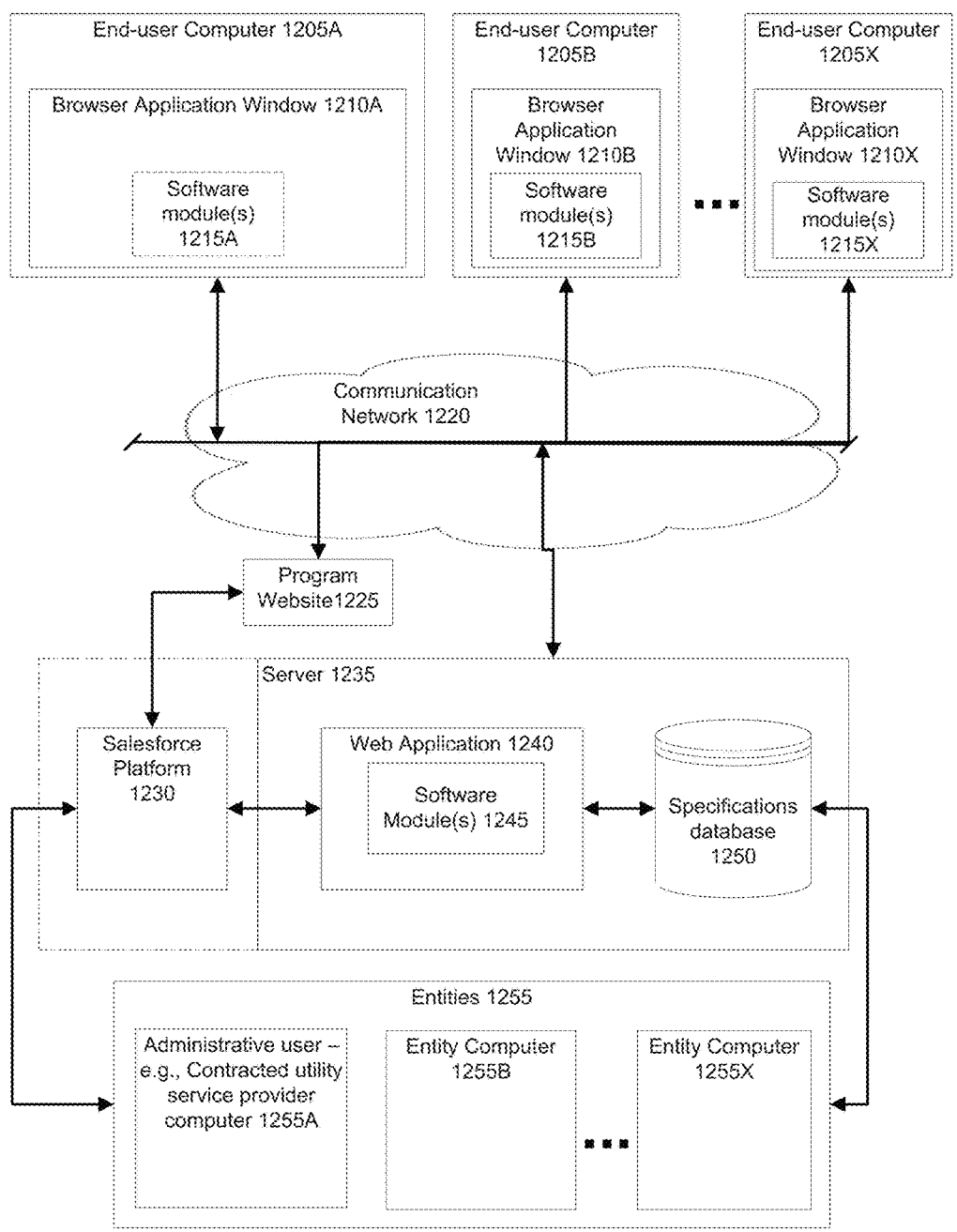
FIG. 12 is an illustration of an exemplary computer-implemented system and computer-readable code product for performing engineering review of energy consumption by one or more equipment FIG. 13 includes illustrations of exemplary user-interface pages for the invoicing software module.

FIG. 12 is an illustration of an exemplary computer-implemented system and computer-readable code product 1200 for performing engineering review of energy consumption by one or more equipment. A server 1235 receives end-user configurations corresponding to one or more first equipment and a selection of one or more enrollment programs. An end-user, on an end-user computer 1205A-X, may provide end-user configurations via web sites, or one or more auto-submit Adobe Acrobat® forms, illustrated as software module(s) 1215A-X, on browser application window 1210A-X. The program website 1225 hosts the website 1215A-X and may provide these to the end-user computers 1205A-X when a request is made by the respective end-users on these computers. The program website 1225 is provided by computer-readable code defined in the Salesforce Platform® 1230. The Salesforce Platform® 1230 is a Platform as a Server (PaaS) system that provides cloud computing and cloud application hosting for third-party organizations. The system 1200 may include computer-readable code hosted by the Salesforce Platform 1230, which is illustrated as an extended part of the server 1235.

The Salesforce Platform® 1230 connected to Server 1235 includes software module(s) for providing auto-submit Adobe Acrobat® forms to the end-user and for receiving the end-user configurations for the one or more first equipment, from the end-user. The end-user configurations are also shared with the software module(s) 1245 of web application 1240. The one or more first equipment described by the end-user is directly or indirectly configured to consume energy from one or more energy sources. Further, each enrollment program corresponds to one or more methodologies for calculating energy savings obtained when the one or more first equipment is replaced by one or more second equipment.

The specifications database 1250 provides specifications relating to the end-user configuration and matches requests for identifying existing equipment, as described in detail above, with respect to FIGS. 1 and 6. The specifications database 1240 is resident in server 1235. Further, the specifications database 1240 provides the one or more second equipment and second equipment specifications. The one or more second equipment is a proposed replacement for the one or more first equipment and each second equipment specification corresponds to the selected enrollment program.

The software module(s) 1245 in server 1235 is responsible for retrieving and the second equipment specification from the specification database. Further, the software module(s) 1245 in server 1235 is configured to provide the second equipment specifications responsive to the end-user configurations. Such second equipment specifications include one or more of: a demand consumption value for the one or more second equipment; one or more purchase incentives offered by one or more entities related to the selected enrollment program and the one or more second equipment; an attribute value corresponding to a demand consumption value of each component in the one or more second equipment; and one or more eligibility rules for determining if the one or more second equipment qualifies for one or more prescribed measures corresponding to one or more purchase incentives.

The software module(s) 1245 in server 1235 is also responsible for calculating an energy savings value from the demand consumption value. The software module(s) 1245 also calculates an invoicing statement, which corresponds to the end-user configuration and the one or more second equipment. The invoicing statement includes a bill of materials for the one or more second equipment and fields to receive an actual unit cost for one or more entries in the bill of materials. The software module(s) 1245 in server 1235 prepares an engineering review report and pushes the calculated values to the Salesforce Platform® 1230. The Salesforce Platform® 1230 is also responsible for hosting the engineering review report for the one or more second equipment. The engineering review report includes the energy savings value, the invoicing statement, and a mapping of the one or more second equipment to one or more of the second equipment specifications.

The software module 1245 transmits summary values from the engineering review report via the program website 1225. The engineering review report, as backup material, is hosted on Salesforce Platform® 1230, and is accessible to the efficient-energy service providers or by one or more administrative users, via the computers 1255. In an exemplary implementation, an administrative user is a contracted utility service provider as illustrated 1255A, or an entity 1255B-X. In an exemplary implementation, the Salesforce Platform® 1230 includes a software module for providing end-users with the ability to download or obtain a copy of the backup engineering review report. In such an implementation, the engineering review report is prepared directly by the software module 1245 and is transmitted via the program website 1225.

The program website 1225 renders as software module(s) 1215A-X in the browser application window 1210A-X on the respective end-user's computer. The engineering review report enables an end-user to access engineering review of the energy savings realized by replacing the one or more first equipment with the one or more second equipment.

The Salesforce Platform® 1230 of the server 1235 allows one or more administrative users, on one or more computers 1255, to access the data gathered from the end-user configuration and the engineering review reports for ad-hoc reporting. Further, the contracted utility service providers 1255 may also access the specifications database 1250 via a software module in the specifications database 1250 dedicated to providing such access. The dedicated software module in the specifications database 1250 is typically an administrative interface to the administrative user computers. Utility service providers and other related entities 1255 may use browsers on computers 1255A-X to access CRM components of the Salesforce Platform® 1230.

FIG. 13 includes exemplary illustrations of user-interface pages 1300A and 1300B for the invoicing software module. FIG. 13 further illustrates the detail 1300A and 1300B presented in the invoice for the reconciliation tool of the invoicing software module. The tool requests an end-user or contractor to enter quantity and unit cost paid for each piece of equipment. The total is then summed to determine the cap for any potential purchase incentive amount. An end-user may submit multiple invoices 1300B via the tool.

In an exemplary implementation, the equipment, components, and programs disclosed herein include custom lighting and any combination of existing and proposed equipment including but not limited to fluorescent (CFL, TS, T8, T10, T12), induction, LED, metal halide, high pressure sodium, low pressure sodium, mercury vapor, incandescent, halogen, traffic signals. Exemplary purchase incentives are applicable as paid per lamp, per fixture, per demand saved, per energy saved or some combination of the above. In another exemplary implementation, the equipment, components, and programs disclosed herein include prescriptive lighting. Specific combinations of existing and proposed equipment may be determined by the authoritative body/jurisdiction, typically a region or state. Varying rules for energy savings and incentive calculations are applicable in such cases. In another exemplary implementation, the equipment, components, and programs disclosed herein include custom HVAC unit replacement Such HVAC units include any combination of existing and proposed equipment, including but not limited to packaged units, split systems, heat pumps (air-source, water-source ground-source), chillers (air-cooled, water-cooled, evaporative-cooled), boilers. The Actual energy savings calculations are applicable using DOE2 algorithm as disclosed above, with respect to FIG. 1. Such incentive are typically paid per unit, per demand saved, per energy saved, or some combination of the above.

In yet another exemplary implementation, the equipment, components, and programs disclosed herein include custom HVAC controls. Such controls include, but are not limited to demand controlled ventilation, airside economizer control, programmable thermostat control, static pressure reset controls, etc. An actual energy savings calculations is applicable using DOE2 algorithm as disclosed above, with respect to FIG. 1. Exemplary purchase incentives, in this case are paid per control, per demand saved, per energy saved, or some combination of the above. In yet another exemplary implementation, the equipment, components, and programs disclosed herein include prescriptive HVAC unit replacement. Here, specific combinations of existing and proposed equipment, as determined by the authoritative body/jurisdiction (typically state), is available to the end-user. Further, varying rules for energy savings and incentive calculations may apply depending on the entity offering such purchase incentives.

In yet another exemplary implementation, the equipment, components, and programs disclosed herein include prescriptive HVAC controls. These controls include, but are not limited to demand controlled ventilation, airside economizer control, programmable thermostat control, static pressure reset controls, etc. Further, varying rules for energy savings and incentive calculations may apply depending on the entity offering such purchase incentives. In yet another exemplary implementation, the equipment, components, and programs disclosed herein include custom HVAC Variable Frequency Drives (VFDs). Adding VFDs to HVAC pumps (chilled water, hot water, condenser water) or fans (supply, return) are ways to implement these components into existing equipment In this case, as in some previous cases, the actual energy savings calculations is proposed using the DOE2 algorithm. Purchase incentive are applicable, paid per unit, per motor hp controlled, per energy saved, or some combination of the above.

In yet another exemplary implementation, the equipment, components, and programs disclosed herein include prescriptive HVAC VFDs. Specific combinations of existing and proposed equipment are applicable, as allowed and determined by the authoritative body per jurisdiction (typically state). Further, varying rules for energy savings and incentive calculations may apply depending on the entity offering such purchase incentives. In yet another exemplary implementation, the equipment, components, and programs disclosed herein include custom process VFDs. In such cases, VFDs are added to existing process motors. Here, actual energy savings calculations are obtained by the purchase incentives of paid per unit, per motor hp controlled, per energy saved, or some combination of the above. In yet another exemplary implementation, the equipment, components, and programs disclosed herein include custom motor replacement. Here, actual energy savings calculations are applicable using the DOE2 algorithm. The purchase incentive here is paid per unit, per motor hp, per demand saved, per energy saved, or some combination of the above. In yet another exemplary implementation, the equipment, components, and programs disclosed herein include prescriptive motor replacement, where specific combinations of proposed and existing equipment are applicable, as determined by the authoritative body per jurisdiction (typically state). Further, varying rules for energy savings and incentive calculations may apply depending on motor size (hp), motor efficiency, cost per unit, etc.

In yet another exemplary implementation, the equipment, components, and programs disclosed herein include prescriptive strip curtains for walk-in coolers; walk-in freezers; and refrigerated warehouses. In such an implementation, specific combinations of proposed and existing equipment are determined by the authoritative body per jurisdiction (typically state). Further, varying rules for energy savings and incentive calculations may apply based on square feet (sq. ft) of strip curtains, number of entrances, type of location, and the cost per sq. ft. In yet another exemplary implementation, the equipment, components, and programs disclosed herein include prescriptive EnergyStar® commercial solid door refrigerators and freezers. Here, specific combinations of proposed and existing equipment are applicable, as determined by the authoritative body per jurisdiction (typically state). Further, varying rules for energy savings and incentive calculations may apply based on cubic feet, and cost per unit. In yet another exemplary implementation, the equipment, components, and programs disclosed herein include prescriptive EnergyStar® ice machines. Specific combinations of proposed and existing equipment are determined by the authoritative body per jurisdiction (typically state). Further, varying rules for energy savings and incentive calculations may apply based on capacity (lbs per day), and cost per unit.

In yet another exemplary implementation, the equipment, components, and programs disclosed herein include prescriptive EnergyStar® steam cookers. Specific combinations of proposed and existing equipment are determined by the authoritative body per jurisdiction (typically state). Further, varying rules for energy savings and incentive calculations may apply based on the number of pans, steam cooker, and cost per unit. In yet another exemplary implementation, the equipment, components, and programs disclosed herein include prescriptive EnergyStar® commercial water heaters, heat pumps, and electric appliances. Specific combinations of proposed and existing equipment are determined by the authoritative body per jurisdiction (typically state). Further, varying rules for energy savings and incentive calculations may apply based on size (for e.g., in gallons), cost per 100 gallons, and the number of unit. In yet another exemplary implementation, the equipment, components, and programs disclosed herein include prescriptive pre-rinse sprayers. Specific combinations of proposed and existing equipment are determined by the authoritative body per jurisdiction (typically state). Further, varying rules for energy savings and incentive calculations may apply based on flow rate—gallons per minute (gpm), and cost per unit.

In yet another exemplary implementation, the equipment, components, and programs disclosed herein include prescriptive vending equipment controllers. Specific combinations of proposed and existing equipment are determined by the authoritative body per jurisdiction (typically state). Further, varying rules for energy savings and incentive calculations may apply based on capacity, i.e., the number of cans), and cost per unit. In yet another exemplary implementation, the equipment, components, and programs disclosed herein include prescriptive laundry equipment. Specific combinations of proposed and existing equipment are determined by the authoritative body per jurisdiction (typically state). Further, varying rules for energy savings and incentive calculations may apply based on capacity, in cubic feet, efficiency, and cost per unit. In yet another exemplary implementation, the equipment, components, and programs disclosed herein include prescriptive commercial smart strip plug outlets. Specific combinations of proposed and existing equipment are determined by the authoritative body per jurisdiction (typically state). Further, varying rules for energy savings and incentive calculations may apply based on type of equipment controlled, and the cost per unit. In yet another exemplary implementation, the equipment, components, and programs disclosed herein include prescriptive hot food holding cabinets. Specific combinations of proposed and existing equipment re determined by the authoritative body per jurisdiction (typically state). Further, varying rules for energy savings and incentive calculations may apply based on capacity, in cubic feet, and cost per unit. In yet another exemplary implementation, the equipment, components, and programs disclosed herein include prescriptive EnergyStar® commercial fryers. Specific combinations of proposed and existing equipment are determined by the authoritative body per jurisdiction (typically state). Further, varying rules for energy savings and incentive calculations may apply based on number of units, and cost per unit. In yet another exemplary implementation, the equipment, components, and programs disclosed herein include prescriptive EnergyStar® commercial ovens, which may be convection-type or convention-type. Specific combinations of proposed and existing equipment are determined by the authoritative body per jurisdiction (typically state). Further, varying rules for energy savings and incentive calculations may apply based on number of units, cost per unit.

In yet another exemplary implementation, the equipment, components, and programs disclosed herein include prescriptive EnergyStar® commercial griddles. Specific combinations of proposed and existing equipment are determined by the authoritative body per jurisdiction (typically state). Further, varying rules for energy savings and incentive calculations may apply based on number of units, cost per unit. In yet another exemplary implementation, the equipment, components, and programs disclosed herein include prescriptive anti-sweat heat controls for such equipment as, cooler doors or freezer doors. Specific combinations of proposed and existing equipment are determined by the authoritative body per jurisdiction (typically state). Further, varying rules for energy savings and incentive calculations may apply based on number of doors, and cost per door. In yet another exemplary implementation, the equipment, components, and programs disclosed herein include prescriptive window film. Specific combinations of proposed and existing equipment are determined by the authoritative body per jurisdiction (typically state). Further, varying rules for energy savings and incentive calculations may apply based on sq. ft. of window film, and the cost per 100 sq. ft. In yet another exemplary implementation, the equipment, components, and programs disclosed include residential appliances (e.g., appliances certified as Energy Star®, etc.). Such residential appliances include, refrigerators, freezers, combo refrigerator per freezer, clothes washers, clothes driers, dishwashers, residential HVAC, residential Energy Star® Fans, ceiling fans, attic fans, whole house fans, pool pumps—commercial or residential, solar water heaters—commercial or residential, cool roofs (low albedo, i.e. white roof), process steam, and steam traps.

In an implementation, the software modules include multiple levels of control for the end-user, the contracted utilities service provider, the efficient-energy service, and the other entities disclosed throughout this disclosure. In one implementation, the software modules disclosed above and made available to one or more end-users, allows an end-user to submit end-user configurations, including an application for a purchase incentive; and perform other user-interface oriented functions, such as, create an estimate for a project, a link an application to an estimate, submit invoices for the application, submit documents for the application, submit the completed estimate for approval and payment, and view information about the approval status of a submitted application.

In another implementation, an administrative level use of the software modules disclosed above allows an administrator, such as a contracted utilities service provider or the efficient-energy service provider, to enter information about an application that has been received; read documents and other information relating to the application; read details of the estimate that has been created for the application; progress the application through a series of reviews and statuses; and approve the application. An administrative user may track the progress of an application that has been received from an end-user or a contractor. In yet another implementation, a management level use of the software modules disclosed above allows a manager to track the overall progress of an enrollment program, such as the total number of applications approved, incentives approved, and energy savings claimed during a program year.

The exemplary methods and acts described in the implementations presented previously are illustrative, and, in alternative implementations, certain acts can be performed in a different order, in parallel with one another, omitted entirely, and/or combined between different exemplary implementations, and/or certain additional acts can be performed without departing from the scope and spirit of the disclosure. Accordingly, such alternative implementations are included in the disclosures described herein.

The exemplary implementations can be used with computer hardware and software that perform the methods and processing functions described above. Exemplary computer hardware include smart phones, tablet computers, notebooks, notepad devices, personal computers, personal digital assistances, and any computing device with a processor and memory area. As will be appreciated by those having ordinary skill in that art, the systems, methods, and procedures described herein can be embodied in a programmable computer, computer executable software, or digital circuitry. The software can be stored on computer readable media. For example, "computer-readable code," "software program," "software module," "scripts," and "computer-readable software code" are software codes used interchangeably for the purposes of simplicity in this disclosure. Further, "memory product," "memory," "computer-readable code product" and storage can include such media as floppy disk, RAM, ROM, hard disk, removable media, flash memory, memory stick, optical media, magneto-optical media, CD-ROM, etc.

Although specific implementations have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary implementations, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A computer-implemented method for generating an engineering review report, including one or more purchase incentives, to facilitate replacement of one or more pieces of energy-use equipment located in a building envelope, the computer-implemented method comprising:

receiving, at a computer, end-user configurations corresponding to one or more first energy-use equipment, identification of building envelope configuration information, a zip-code of a geographic location of the one or more first equipment and a selection of one or more enrollment programs, wherein the one or more first equipment is directly or indirectly configured to consume energy from one or more energy sources, and each enrollment program corresponds to one or more methodologies for calculating energy savings obtained when the one or more first energy-use equipment is replaced by one or more second energy-use equipment;

determining, by a tracking module on the computer, environmental conditions at the geographic location of the one or more first energy-use equipment based on the provided zip-code;

receiving, from a specifications database to the computer, an identification of the one or more second energy-use equipment and second energy-use equipment specifications, the one or more second energy-use equipment being a proposed replacement for the one or more first energy-use equipment and each second energy-use equipment specification corresponding to the selected enrollment program, each second energy-use equipment specification comprising each of:

a demand consumption value for the one or more second energy-use equipment;

one or more purchase incentives offered by one or more entities related to the selected enrollment program and the one or more second energy-use equipment, the one or more entities being selected from a manufacturer of the one or more second energy-use equipment and an energy provider;

an attribute value corresponding to a demand consumption value of each component in the one or more second energy-use equipment; and one or more eligibility rules for determining if the one or more second energy-use equipment qualifies for one or more prescribed measures corresponding to one or more purchase incentives;

calculating, by the computer, an incentive amount in accordance with the one or more purchase incentives offered by the one or more entities related to the selected enrollment program and the one or more second energy-use equipment, wherein the selected enrollment program includes an incentive amount cap;

calculating, by the computer, an energy savings value calculated from the demand consumption value, the end-user configurations, the environmental conditions and the building envelope configuration information, wherein the energy savings value for the one or more second energy-use equipment in the specifications database is generated by storing and re-calculating, in real-time, the actual demand consumption values for the one or more second energy-use equipment from users of the one or more second energy-use equipment other than the end- user;

preparing, by the computer, an engineering review report for the one or more second energy-use equipment, the engineering review report including the energy savings value for replacing the one or more first energy-use equipment with the one or more second energy-use equipment, a mapping of the one or more second energy-use equipment to the end-user configurations, and the calculated incentive amount in accordance with the one or more purchase incentives offered by the one or more entities related to the selected enrollment program and the one or more second energy-use equipment, including the incentive amount cap;

transmitting, from the computer, the engineering review report to an end-user, thereby enabling an end-user to access engineering review of the energy savings realized by replacing the one or more first energy-use equipment with the one or more second energy-use equipment, wherein the energy savings to be realized by replacing the one or more first energy-use equipment with the one or more second energy-use equipment indicated in the engineering review report is electronically accepted by the end-user;

receiving, by the computer, an indication by the end-user that the end-user accepts the engineering review report, including energy savings and the calculated incentive amount for replacing the one or more first energy-use equipment with the one or more second energy-use equipment described in the transmitted engineering review report; and replacing by the end-user the one or more first energy-use equipment with the one or more second energy-use equipment in accordance with the project.

2. The computer-implemented method according to claim 1, wherein the engineering review report is an instant approval or pre-approval certification provided to the end-user for use of the one or more second energy-use equipment to replace the one or more first energy-use equipment.

3. The computer-implemented method according to claim 1, wherein the purchase incentives are stored and updated in the specifications database, in real-time, as the purchase incentives change over time.

4. The computer-implemented method according to claim 1, wherein the attribute value in the specifications database corresponds to a demand consumption value of each component in the one or more second energy-use equipment.

5. The computer-implemented method according to claim 1, wherein the eligibility rules for the prescribed measures in the specifications database include one or more of: rules for qualification under an equipment-related prescribed measures and a minimum performance-related prescribed measures.

6. The computer-implemented method according to claim 5, wherein the equipment-related prescribed measures include compliance with one or more of: an EnergyStar® certification, a Consortium of Energy Efficiency® (CEE) certification, and a DesignLights Consortium® (DLC) certification.

7. The computer-implemented method according to claim 5, the minimum performance-related prescribed measures include compliance with one or more of: an Efficiency Energy Ratio (EER), a Coefficient of Performance (COP), and a fixture efficiency.

8. The computer-implemented method according to claim 1, wherein the purchase incentives include one or more of: an interior rate incentive, an exterior rate incentive, an equipment type incentive, per piece of equipment incentive, per unit size of a piece of an equipment type incentive, per energy saved type incentive, or an operating entity incentive offered by the operator of an energy supply utility company.

9. The computer-implemented method according to claim 1, wherein the second energy-use equipment specification in the specification database is available for one or more of: different geographical locations based on weather stations; different hours of operation; different set points; different building envelope values and baseline designs; different manufacturers' specifications; and for any combination of the component within the one or more second energy-use equipment, if the component had to be replaced by one or more new components.

10. The computer-implemented method according to claim 1, wherein the specification database is selectively available for access by the end-user using the computer.

11. The computer-implemented method according to claim 1, further comprising:

calculating, by the computer, an invoicing statement corresponding to the end- user configurations and the one or more second energy-use equipment, the invoicing statement comprising a bill of materials for the one or more second energy-use equipment and fields to receive an actual unit cost for one or more entries in the bill of materials; and receiving, by an invoicing module of the computer, in accordance with an invoicing statement in the engineering review report for the one or more second energy-use equipment, invoice details including quantity and unit cost paid for the one or more second energy-use equipment by the end-user and facilitating application of the calculated incentive amount to the end-user.

12. The computer-implemented method according to claim 1, wherein the enrollment program is one of a customized enrollment program or predetermined listing of enrollment programs, each of the customized or predetermined enrollment programs available from the one or more entities.

13. The computer-implemented method according to claim 1, wherein the enrollment program is enforced using enrollment program rules, the enrollment program rules applied by a dedicated software module.

14. The computer-implemented method according to claim 1, wherein the energy savings and the demand consumption values of the equipment specifications are calculated using a modified DOE-2 building envelope specification in accordance with the identified building envelope configuration information.

15. The computer-implemented method according to claim 1, wherein the building envelope configuration information is identified in accordance with end-user selection from a predetermined list of prototype building envelope configurations in accordance with the attributes of the building envelope and end-user input of at least one modification to the prototype envelope configuration in accordance with the attributes of the building envelope.

16. The computer-implemented method according to claim 1, wherein the environmental conditions include hour-by-hour outside temperature readings retrieved by the tracking module from a closest National Oceanic and Atmospheric Administration reporting station to the provided zip-code.

17. A computer-implemented method for facilitating replacement of one or more pieces of energy-use equipment located in a building envelope, the computer-implemented method comprising:
 receiving, at a computer, end-user configurations corresponding to one or more first energy-use equipment, identification of building envelope configuration information, a zip-code of a geographic location of the one or more first equipment and a selection of one or more enrollment programs, wherein the one or more first equipment is directly or indirectly configured to consume energy from one or more energy sources, and each enrollment program corresponds to one or more methodologies for calculating energy savings obtained when the one or more first energy-use equipment is replaced by one or more second energy-use equipment;
 determining, by a tracking module on the computer, environmental conditions at the geographic location of the one or more first energy-use equipment based on the provided zip-code;
 receiving, from a specifications database to the computer, an identification of the one or more second energy-use equipment and second energy-use equipment specifications, the one or more second energy-use equipment being a proposed replacement for the one or more first energy-use equipment and each second energy-use equipment specification corresponding to the selected enrollment program, each second energy-use equipment specification comprising each of:
  a demand consumption value for the one or more second energy-use equipment;
  one or more purchase incentives offered by one or more entities related to the selected enrollment program and the one or more second energy-use equipment, the one or more entities being selected from a manufacturer of the one or more second energy-use equipment and an energy provider;
  an attribute value corresponding to a demand consumption value of each component in the one or more second energy-use equipment; and
  one or more eligibility rules for determining if the one or more second energy-use equipment qualifies for one or more prescribed measures corresponding to one or more purchase incentives;
 calculating, by the computer, an incentive amount in accordance with the one or more purchase incentives offered by the one or more entities related to the selected enrollment program and the one or more second energy-use equipment;
 calculating, by the computer, an energy savings value calculated from the demand consumption value, the end-user configurations, the environmental conditions and the building envelope configuration information, wherein the energy savings value for the one or more second energy-use equipment in the specifications database is generated by storing and re-calculating, in real-time, the actual demand consumption values for the one or more second energy-use equipment from users of the one or more second equipment other than the end-user;
 preparing, by the computer, an engineering review report for the one or more second energy-use equipment, the engineering review report including the energy savings value for replacing the one or more first energy-use equipment with the one or more second energy-use equipment, a mapping of the one or more second energy-use equipment to the end-user configurations, and the calculated incentive amount in accordance with the one or more purchase incentives offered by the one or more entities related to the selected enrollment program and the one or more second energy-use equipment;
 transmitting, from the computer, the engineering review report to an end-user, thereby enabling an end-user to access engineering review of the energy savings realized by replacing the one or more first energy-use equipment with the one or more second energy-use equipment;
 receiving, by the computer, an indication by the end-user that the end-user electronically accepts the engineering review report, including energy savings and the calculated incentive amount for replacing the one or more first energy-use equipment with the one or more second energy-use equipment described in the transmitted engineering review report; and
 replacing by the end-user the one or more first equipment with the one or more second equipment in accordance with the project.

18. The computer-implemented method according to claim 17, further comprising:
 calculating, by the computer, an invoicing statement corresponding to the end-user configurations and the one or more second energy-use equipment, the invoicing statement comprising a bill of materials for the one or more second energy-use equipment and fields to receive an actual unit cost for one or more entries in the bill of materials; and
 receiving, by an invoicing module of the computer, in accordance with an invoicing statement in the engineering review report for the one or more second energy-use equipment, invoice details including quantity and unit cost paid for the one or more second energy-use equipment by the end-user and facilitating application of the calculated incentive amount to the end-user.

* * * * *